US009747497B1

(12) United States Patent
Sharma et al.

(10) Patent No.: US 9,747,497 B1
(45) Date of Patent: Aug. 29, 2017

(54) METHOD AND SYSTEM FOR RATING IN-STORE MEDIA ELEMENTS

(75) Inventors: Rajeev Sharma, State College, PA (US); Varij Saurabh, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 811 days.

(21) Appl. No.: 12/386,655

(22) Filed: Apr. 21, 2009

(51) Int. Cl.
*G06K 9/00* (2006.01)

(52) U.S. Cl.
CPC ..... *G06K 9/00369* (2013.01); *G06K 9/00771* (2013.01)

(58) Field of Classification Search
CPC ....................................................... G06Q 30/02
USPC .................................. 705/10, 500; 600/558
See application file for complete search history.

(56) References Cited

U.S. PATENT DOCUMENTS

| 5,991,734 | A | 11/1999 | Moulson |
| 6,045,226 | A | 4/2000 | Claessens |
| 6,228,038 | B1 * | 5/2001 | Claessens ............. A61B 3/113 351/210 |
| 6,286,005 | B1 | 9/2001 | Cannon |
| 6,516,464 | B1 | 2/2003 | Claessens |
| 6,563,423 | B2 | 5/2003 | Smith |
| 7,003,476 | B1 | 2/2006 | Samra et al. |
| 7,006,979 | B1 | 2/2006 | Samra et al. |
| 7,006,982 | B2 * | 2/2006 | Sorensen ........... G06Q 30/0201 705/7.29 |
| 7,302,475 | B2 | 11/2007 | Gold et al. |
| 7,374,096 | B2 | 5/2008 | Overhultz et al. |
| 2002/0161651 | A1 * | 10/2002 | Godsey ................ G06Q 20/202 705/22 |
| 2003/0002712 | A1 * | 1/2003 | Steenburgh ........ G06K 9/00778 382/103 |
| 2003/0039379 | A1 | 2/2003 | Gutta et al. |

(Continued)

OTHER PUBLICATIONS

U.S. Appl. No. 11/805,321, Sharma et al.
(Continued)

*Primary Examiner* — Talia Crawley

(57) ABSTRACT

The present invention is a method and system for rating in-store media elements based on the measurement for behavior patterns and demographics of the audience in the vicinity of the media element, where a plurality of input images of the audience are captured by at least a means for capturing images in the vicinity of the media element. The input images are processed by automated video analytic algorithms in order to measure the behavior patterns and demographics of each person in the audience tied to the media element. The measurements for the behavior patterns and demographics of the audience from the target media elements are aggregated. A set of ratings for the media element is calculated based on the measurements. The measured media elements are sampled, and the audience measurement for the sample is extrapolated to other media elements for in-store locations or for a group of stores. The ratings are converted into a standardized output. The standardized output facilitates comparisons among a plurality of media elements. The rating can be used to plan media types in the media element for reaching targeted demographics.

16 Claims, 18 Drawing Sheets

(56) References Cited

U.S. PATENT DOCUMENTS

| | | | | |
|---|---|---|---|---|
| 2004/0130620 A1* | 7/2004 | Buehler | ............ | G06K 9/00335 |
| | | | | 348/143 |
| 2006/0010028 A1* | 1/2006 | Sorensen | ............... | G06Q 30/02 |
| | | | | 705/7.34 |
| 2008/0005045 A1* | 1/2008 | Sorensen | ............. | G06Q 10/063 |
| | | | | 705/500 |

OTHER PUBLICATIONS

U.S. Appl. No. 11/818,554, Sharma et al.
U.S. Appl. No. 11/999,649, Jung et al.
U.S. Appl. No. 12/154,002, Moon et al.
U.S. Appl. No. 12/215,877, Sharma et al.
J. F. Cohn, et al., "Automated face analysis by feature point tracking has high concurrent validity with manual FACS coding," Psychophysiology, pp. 35-43, 1999.
I. A. Essa and A. P. Pentland, "Facial expression recognition using a dynamic model and motion energy," presented at International Conference on Computer Vision, Jun. 1995.
Y. Yacoob and L. S. Davis, "Recognizing human facial expression," University of Maryland, Technical Report CS-TR-3265, May 1994.

\* cited by examiner

| CATEGORY OF CLUSTERED SITES | MEDIA ELEMENT TYPE |
|---|---|
| CLUSTER CATEGORY 1 | MT1  MT2  MT3  MT4 |
| CLUSTER CATEGORY 2 | MT5  MT6  MT7 |
| CLUSTER CATEGORY 3 | MT8  MT9  MT10 |
| ⋮ | ⋮ |

162

| MEDIA ELEMENT TYPE | MEDIA ELEMENT CLUSTER CATEGORY, SITE, AND LOCATION | | |
|---|---|---|---|
| MT1 | [CAT1, SITE1, LOC1] | [CAT1, SITE2, LOC1] | |
| MT2 | [CAT1, SITE1, LOC2] | [CAT1, SITE2, LOC2] | [CAT1, SITE3, LOC2] |
| MT3 | [CAT1, SITE1, LOC3] | [CAT1, SITE3, LOC3] | |
| MT4 | [CAT1, SITE1, LOC4] | [CAT1, SITE2, LOC4] | [CAT1, SITE3, LOC4] |
| MT5 | [CAT2, SITE4, LOC5] | [CAT2, SITE5, LOC5] | |
| MT6 | [CAT2, SITE4, LOC6] | [CAT2, SITE5, LOC6] | |
| MT7 | [CAT2, SITE4, LOC7] | [CAT2, SITE5, LOC7] | |
| MT8 | [CAT3, SITE6, LOC8] | [CAT3, SITE7, LOC8] | |
| MT9 | | [CAT3, SITE7, LOC9] | |
| MT10 | [CAT3, SITE6, LOC10] | [CAT3, SITE7, LOC10] | |
| ⋮ | ⋮ | | |

MEDIA ELEMENT MEi (MEDIA TYPES: MT1, MT2, ..., MTn) —622

| ID | TRACK SEQUENCE (Xi,Yi) | TIME Tin | TIME Tout | BEHAVIOR CLASS | DEMO CLASS | IMPRESSION LEVEL | EMOTION CLASS | ... |
|---|---|---|---|---|---|---|---|---|
| 1 | TRACK 1 | T1 | TO1 | BA1 | D3 | IMP0 | E4 | |
| 2 | TRACK 2 | T2 | TO2 | BE3 | D1 | IMP1 | E2 | |
| 3 | TRACK 3 | T3 | TO3 | BP1 | D2 | IMP2 | E1 | |
| 4 | TRACK 4 | T4 | TO4 | BA2 | D2 | IMP0 | E3 | |
| 5 | TRACK 5 | T5 | TO5 | BE1 | D2 | IMP1 | E3 | |
| 6 | TRACK 6 | T6 | TO6 | BE1 | D3 | IMP1 | E3 | |
| 7 | TRACK 7 | T7 | TO7 | BP2 | D1 | IMP2 | E1 | |
| 8 | TRACK 8 | T8 | TO8 | BA1 | D1 | IMP0 | E5 | |
| ⋮ | | | | | | | | |
| i | TRACK i | Ti | TOi | BE3 | D1 | IMP1 | E5 | |
| ⋮ | | | | | | | | |

Fig. 12

METHOD AND SYSTEM FOR RATING IN-STORE MEDIA ELEMENTS

BACKGROUND OF THE INVENTION

Field of the Invention

The present invention is a method and system for rating in-store media elements based on the measurement for behavior patterns and demographics of the audience in the vicinity of the media element, where a plurality of input images of the audience are captured by at least a means for capturing images in the vicinity of the media element and the input images are processed by automated video analytic algorithms in order to measure the behavior patterns and demographics of each person in the audience tied to the media element.

Background of the Invention

U.S. Pat. No. 7,006,982 of Sorensen (hereinafter Sorensen) disclosed a system for analyzing purchase selection behavior utilizing a visibility measure. The system uses mathematical models to define the line of sight and viewing area of the shoppers, and then estimates the products the shoppers may have seen based on their shopper path. The key difference between the system disclosed by Sorensen and the current invention is that Sorensen's system only measures the likelihood that a passing-by shopper may view the product. The framework disclosed in the present invention makes it possible for us to provide a much more scalable shopper behavior measurement system. The current invention can measure the number of shoppers passing by a media element, their dwell time, age, gender, and ethnicity, not possible using Sorensen's system. Sorensen's system also focuses on estimating exposure to products on the shelves, whereas the current invention measures and estimates the exposure and engagement received by media elements. The goal of the two measurement systems is also different—Sorensen's system measures the likelihood that a product is viewed and hence purchased by the shopper, whereas the current invention develops detailed media metrics that will help retailers and advertisers buy and sell in-store media as a measured media. Sorensen also does not use automated vision algorithms for collecting shopper data. The use of vision algorithms enables automated collection of unique data not possible with any other technology.

U.S. Pat. Appl. Pub. No. 20030039379 of Gutta, et al. (hereinafter Gutta) disclosed a system for automatically assessing interest in a displayed product. The method includes capturing image data within a predetermined proximity of the displayed product, identifying people in the captured image data, and assessing the interest in the displayed product based upon the identified people. The key difference between the system disclosed by Gutta and the current invention is that Gutta does not formulate a scalable framework for collecting and analyzing data over large periods of time. The framework disclosed in the present invention makes it possible for us to analyze the shopper exposure to and engagement with different media elements over time and develop media ratios.

U.S. Pat. Appl. Pub. No. 20020161651 of Godsey, et al. (hereinafter Godsey) disclosed a system for tracking consumers in a store environment. The system tracks a plurality of product containers in a store environment and generates a track through the store environment representative of a continuous path followed by each of the product containers to a point-of-sale location. The system disclosed by Godsey is different from the current invention in many ways. Unlike the current invention, Godsey's system does not track shoppers in the stores; it tracks product containers and incorrectly assumes that the product containers transverse the store with the shoppers. This assumption leads to inaccurate data and, consequently, wrong interpretations. Another disadvantage of the system is that it cannot collect the unique types of data, such as engagement and demographics, as can be done by the current invention.

U.S. Pat. No. 7,006,979 of Samra, et al. (hereinafter Samra U.S. Pat. No. 7,006,979) and U.S. Pat. No. 7,003,476 of Samra, et al. (hereinafter Samra U.S. Pat. No. 7,003,476) disclosed systems for analyzing the success of a marketing campaign and for defining targeted marketing campaigns using embedded models and historical data. The systems are dissimilar from the current invention because they are not focused on impact measurement of in-store media elements and are not based on unique vision algorithms.

U.S. Pat. No. 6,286,005 of Cannon (hereinafter Cannon) disclosed computer-based systems for analyzing audience data. Cannon discloses a method and apparatus for quickly and easily retrieving, manipulating, and analyzing large quantities of computer-based data relevant to television-viewing consumers. The key differences between the systems disclosed by Cannon and the one in the current invention are that 1) Cannon primarily focused on a television audience, 2) the process used for data collection is different, 3) measurements provided by two systems are different.

First, the definition of audience is very different from television and in-store media elements. For television measurement, audience is defined as a household which had the television turned on when content was played, whereas for in-store media elements, audience is defined as the group of persons who pass by the element. The definition of audience creates unique challenges in data collection and analysis; it also changes the types of analysis needed by advertisers. Cannon does not cover the challenges offered by digital signage.

Secondly, the system described by Cannon processes data primarily collected through exit interviews, telephone interviews, online surveys, etc., which require active participation from the audience members, whereas the current invention uses automated video-based data collection to acquire the data. The types of data collected are very different. For example, Cannon discusses that the demographic information can include information such as a viewer's age, geographical location, income, and level of education, which cannot be calculated using computer vision algorithms. Therefore, the definition of the demographic information in Cannon is different from that of the current invention. Applicant's demographic information is primarily concerned with the audience in the vicinity of a digital signage, whereas the demographic information in Cannon is primarily concerned with the television-viewing consumers, so the approaches as to how the demographic information is gathered and applied in the embodiments are significantly different between Cannon and the current invention.

Thirdly, the current invention provides unique measurements not offered by Cannon. The current invention includes analyses of the actual time audience members spend in the vicinity of the element, the emotional impact of the content on the audience, and demographic segmentation based on automated estimation of age, gender, ethnicity, and shopping behavior. None of these parameters are measured or analyzed by the system proposed by Cannon.

U.S. Pat. No. 6,516,464, U.S. Pat. No. 6,228,038, and U.S. Pat. No. 6,045,226 of Claessens (hereinafter Claessens) disclosed a system for detecting audience response to audio visual stimuli. The system disclosed in the patent requires a panel of viewers to watch the content and use a computer-based system to respond to it in real time. The viewer can register his or her likes or dislikes and qualitatively explain the response. The data is then used to evaluate the content. The key differences between Claessens' system and the current invention are that Claessens' system requires active participation from the audience and can measure the effectiveness of a piece of content but not of a whole content. The current invention is superior because it directly measures the viewer behavior, is more accurate, and does not require active participation from viewers.

In U.S. Pat. No. 6,045,226, Claessens disclosed a system for measuring the visual attention of subjects for a visible object. The disclosed system emits an invisible beam of light to scan the area of interest. The beam of light is reflected from the retina and/or cornea of said person(s) or animal(s). This reflected beam is used to estimate the direction in which the subject is looking and the duration of view. The system can be used to measure the duration for which a person looks directly at a signage. The key differences between Claessens' system and the current invention are that Claessens' system uses a specified source of radiation to measure the duration of view, and it cannot provide all of the data provided by the current system, such as segmentation and shopping behavior.

U.S. Pat. No. 7,302,475 of Gold, et al. (hereinafter Gold) disclosed a system for measuring reactions to product packaging, advertising, or product features over a computer-based network. The system depends on a web platform to present different images to the respondents and collect their responses using online surveys. The current invention is different from the system disclosed by Gold because it does not depend on audience involvement, and the data is collected unobtrusively.

U.S. Pat. No. 5,991,734 of Moulson (hereinafter Moulson) disclosed a system for measuring the creative value in communications. The system relies on proactive participation from the respondents to collect feedback on creativity of the media. The current invention is different from Moulson's disclosed system because it does not depend on audience involvement, and the data is collected unobtrusively.

U.S. Pat. No. 7,374,096 of Overhultz, et al. (hereinafter Overhultz) disclosed a system for advertising compliance monitoring. The system uses RFID signals to detect the presence and absence of the audience members and of the marketing stimuli. Overhultz' system is different from the current invention because it focuses on measuring whether or not the media element is in the correct location and in the correct orientation, whereas the current invention measures the audience traffic and engagement details. The technologies used by the two patents are also different.

U.S. Pat. No. 6,563,423 of Smith (hereinafter Smith) disclosed a location tracking system to track the movements of customers. This tracking is used to determine a customer's pace, how long a customer stayed at a particular location, and to determine how many customers passed a location. The purchase of a customer is determined by reading the tagged code at the time of purchase and relating this to whether or not the customer visited a particular display earlier.

The system disclosed by Smith is different from the current system because it uses magnetic tags to track customers in the retail space which cannot collect all forms of data collected by the current system, and it does not disclose systems and processes to convert this data to media ratings.

SUMMARY

The present invention is a method and system for rating in-store media elements based on the measurement for behavior patterns and demographics of the people in the vicinity of the media element. In the prior art, there have not been effective means to measure the efficiency of the media element in reaching a targeted audience and the effectiveness of conveying the message of different media types in the media element. The rating system in the present invention will provide a quantitative measure of what exposure the media element is expected to have. By using automated audience measurement, the current invention is able to collect statistically significant data for analysis. Non-intrusive, computer-based measurement also ensures that the data is free from any biases.

The present invention captures a plurality of input images of the people by at least a means for capturing images in the vicinity of the media element. The means for capturing images comprises digital or analog cameras, covering the area of interest in the vicinity of the media element. The input images are processed by automated video analytic algorithms in order to measure the behavior patterns and demographics of each person in the audience tied to the media element. The measurements for the behavior patterns and demographics of the people from the target media elements are aggregated. A set of ratings for the media element is calculated based on the measurements. The behavior patterns comprise traffic count, dwell time, impression, and impact to the audience.

The measured media elements are sampled, and the audience measurement for the sample is extrapolated to other media elements for in-store locations or for a group of stores. For the purpose of extrapolation the media elements and stores are grouped based on the environments they are in and the in-store conditions. The ratings are converted into a standardized output. The standardized output facilitates comparisons among a plurality of media elements.

The rating is used to develop advertising plans to reach targeted demographics and provide them with relevant information. The relative effectiveness of different marketing tactics in the media element is ranked based on the exposure measurement to the media types in the media element. The media types in the media element can be optimized according to the performance ranking of the media element. As a part of the process to represent the rating in a standardized way, the present invention builds a table of the rating for pairs of in-store locations and media types. The ratings consist of standard media measurement metrics such as gross rating point (GRP) and targeted rating point (TRP), exposure, dwell time etc.

The ratings are organized according to segments of people, including demographic information of the people. The segments may be defined by demographics such as gender, age, and ethnicity, or by the type of trip such as a quick trip or a fill-up trip.

The present invention also produces metrics that comprise an attraction index, and an engagement index. The attraction index is defined as the percentage of total traffic that was attracted to the media element. The engagement index is defined as the average time attracted traffic engages with the media element. In addition, a conversion index can be defined as the rate from traffic to attracted audience in an exemplary process of the present invention.

DRAWINGS—FIGURES

FIG. 4 shows an exemplary table for the category of clustered sites and an exemplary table for media element type and information for the exemplary extrapolation process based on the clustering of the sites in an exemplary embodiment of the present invention.

FIG. 12 shows an exemplary table for the data measured by the response measurement processes in the present invention.

DETAILED DESCRIPTION OF THE INVENTION

Figure 1:
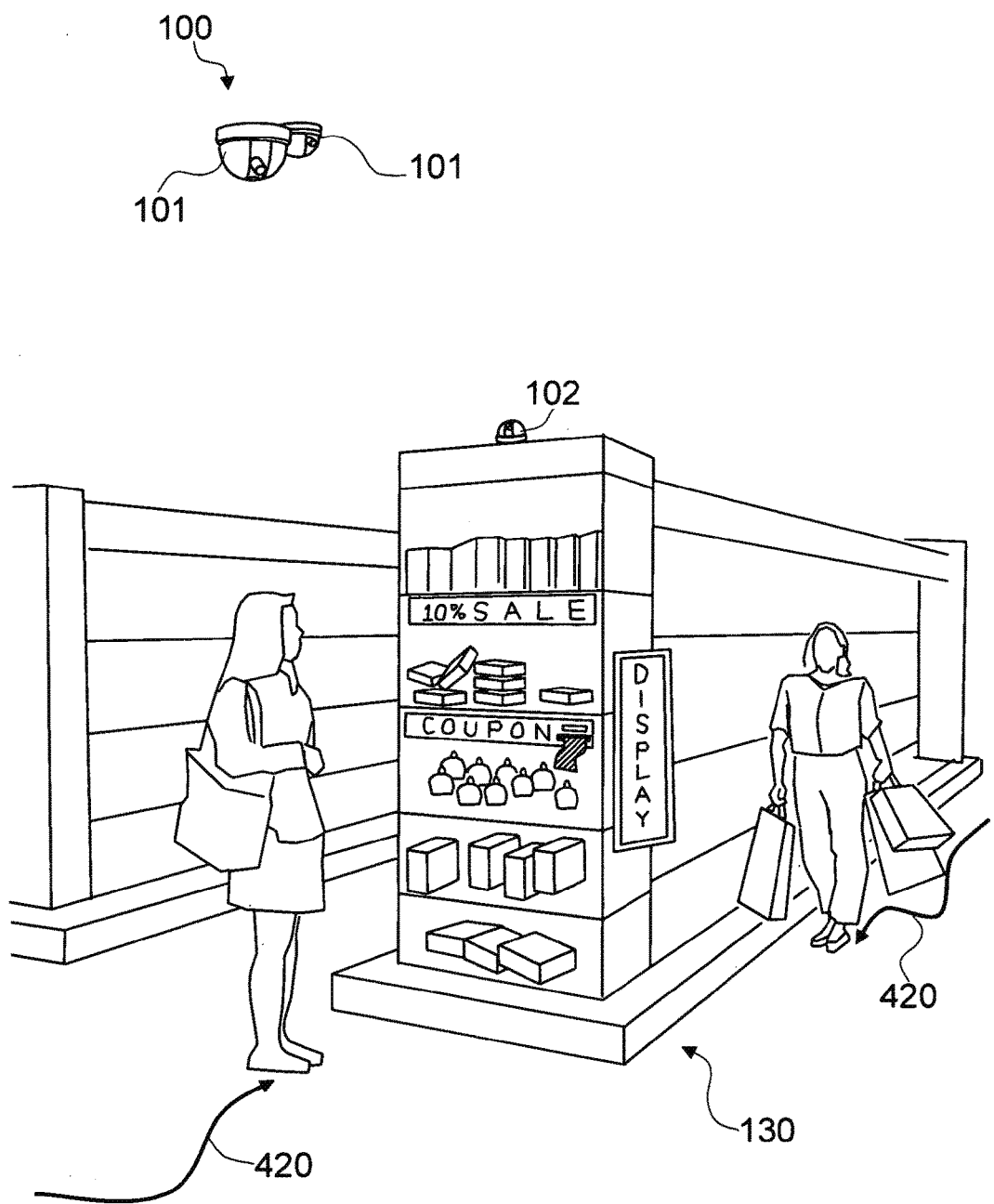
FIG. 1 shows an overview of an application of an exemplary embodiment of the present invention.

FIG. 1 shows an overview of an application of an exemplary embodiment of the present invention.

The present invention is a method and system for rating in-store media elements based on the measurement for behavior patterns and demographics of the audience in the vicinity of the media element. In the present invention a media element is defined as a space or hardware that holds various types of media. In the exemplary application of the present invention shown in FIG. 1, a media element 130 comprises various types of media. In the prior art, there have not been effective means to measure the efficiency of the media element in reaching a targeted audience and the effectiveness of conveying the message of different media types in the media element. The rating system in the present invention will provide a quantitative measure of what exposure the media element is expected to have. By using automated audience measurement, the current invention is able to continuously collect statistically significant data for analysis. Non-intrusive, computer based measurement also ensures that the data is free from any biases.

The present invention captures a plurality of input images of the people by at least a means for capturing images, e.g. 100, in the vicinity of the media element. The means for capturing images comprises digital or analog cameras, covering the area of interest in the vicinity of the media element. A means for capturing images is either a first means for capturing images 101 for a top-down view for the area of the media element or a second means for capturing images 102 for a frontal view of the audience from the media element. For simplicity, the term camera will be used to indicate the means for capturing images in the specification for the present invention. The input images are processed by automated video analytic algorithms in order to measure the behavior patterns and demographics of each person in the audience tied to the media element. The measurements for the behavior patterns and demographics of the people from the target media elements are aggregated. A set of ratings for the media element is calculated based on the measurements. The behavior patterns comprise traffic count, dwell time, impression count, and impression duration in relation to the media element. A path analysis of each person among the people is processed as a part of the behavior analysis. The path analysis is based on the tracking, e.g., 420, of the audience by automated video analytic algorithms. The attributes of the path analysis can comprise information for initial point and destination, global trip, time, and average velocity. The dataset of behavior measurements is correlated with regard to the location of the store and temporal attributes.

The traffic measurement of the people is based on the calculation of the total number of people who were exposed to the media element and had the opportunity to engage with it. The traffic data is analyzed to measure the variations during a predefined window of time, comprising time-of-day, day-of-week, and seasons.

The impression level measurement is based on the detection of an act of viewing the media element by the audience. The conversion rate from traffic to attracted audience is an important measure of the media element's and media type's ability to attract an audience. The analysis of the impression duration is used for measuring the effectiveness of the media element to engage the attracted audience and communicate the message.

The audience data will be used to provide media metrics such as Gross Rating Points (GRP), Targeted Rating Points (TRP), Opportunity to See (OTS), Average Unit Audience (AUA), return on Investment (ROI), etc.

The present invention also produces metrics that comprise an attraction index, and an engagement index. The attraction index is defined as the percentage of total traffic that was attracted to the media element. The engagement index is defined as the average time attracted traffic engages with the media element.

The media elements are grouped based on their location in the store, size, and surrounding in-store conditions across different geographies and store formats in a given retail chain. A representative sample of media elements is selected for audience measurement. The measurements from this sample are converted into standardized ratings and extrapolated to a plurality of media elements in the chain.

The ratings will be useful for planning and measuring in-store marketing campaigns to reach targeted demographics. Different media types in the media element are also ranked based on their relative effectiveness at attracting and engaging an audience. Media type is defined as different classes of content or hardware that can be incorporated in the media element. Examples of media types are static image, dynamic image or video, product display, etc.

The present invention also builds a table of the ratings for a group of pairs that comprise in-store location and media type. The media types in the media element are optimized according to a ranking of the performance of the media element that is calculated based on the response measurement.

The ratings are organized according to segments of an audience. The segments may be defined by demographics such as gender, age and ethnicity, or by the type of trip such as a quick trip or a fill-up trip. The present invention can also measure the effectiveness of the media element by detecting the emotional changes of the audience in response to the media types in the media element.

Figure 2:
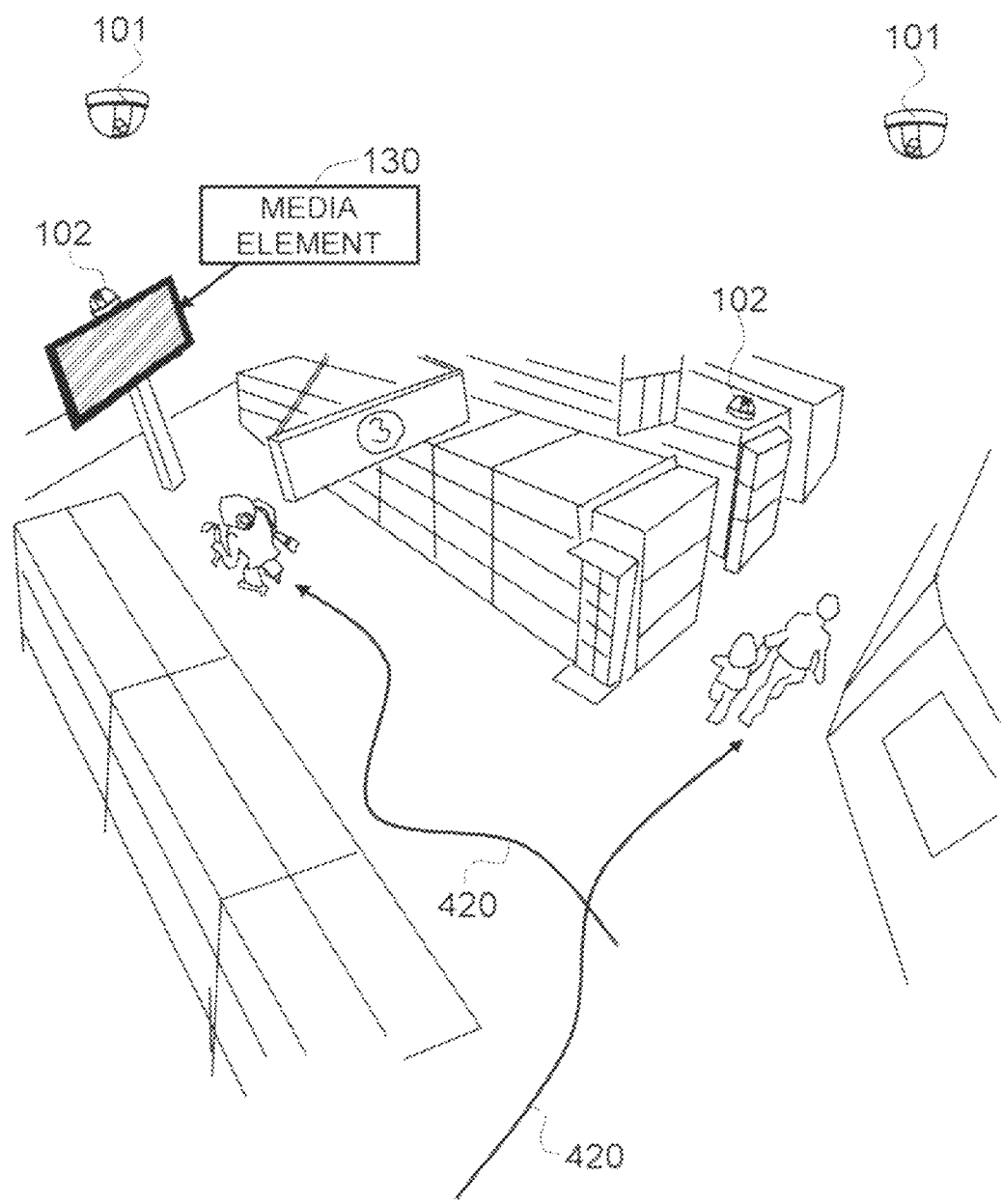
FIG. 2 shows an exemplary tracking of shoppers in the vicinity of a media element.

FIG. 2 shows an exemplary tracking of shoppers in the vicinity of a media element.

The present invention tracks 420 the shoppers in the vicinity of a media element 130, using at least a means for capturing images, such as cameras. The area of the media element 130 can vary depending on the store layout. Therefore, the installation location of the camera(s) needs to be selected to cover the area of interest in the vicinity of a media element in an optimal way.

In a preferred embodiment of the present invention, the means for capturing images is either a first means for capturing images or a second means for capturing images. The first means for capturing images 101 is usually used for a top-down view for the area of the media element. Therefore, the first means for capturing images 101 can be installed where the field-of-view can cover the traffic of the audience in the measured location. The second means for capturing images 102 is usually used for a frontal view of the audience from the media element. Therefore, the second means for capturing images 102 can be installed in the vicinity of a media element in the location for the close view of the people.

Figure 3:
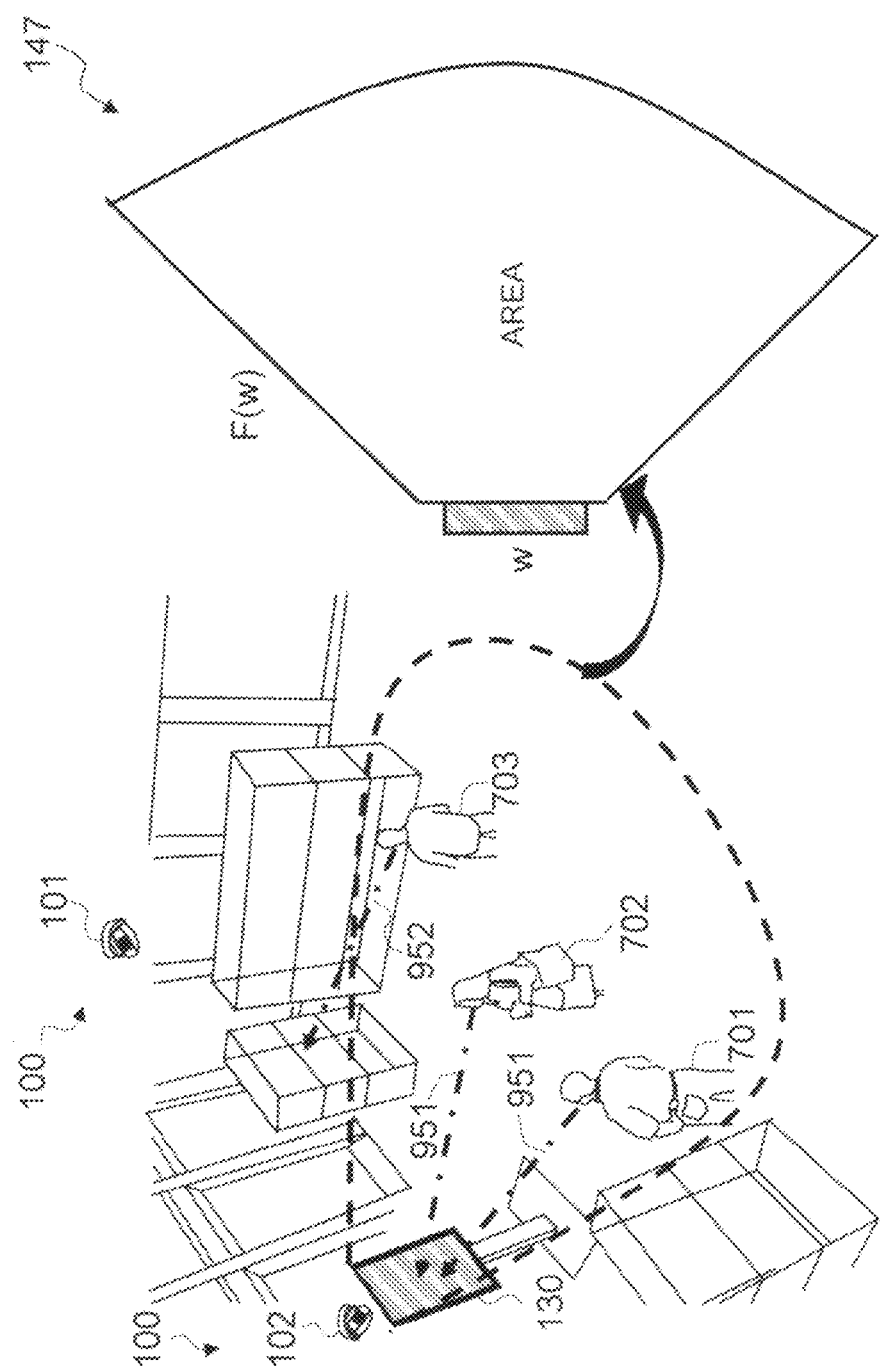
FIG. 3 shows an exemplary zone of influence marked for the media element.

FIG. 3 shows an exemplary zone of influence marked for the media element.

Zone of influence 147 is the area surrounding the media element 130, where shoppers have an opportunity to see or experience the element and engage with it. The size and shape of the zone of influence 147 will depend on the size of the media element 130 and the presence of other objects in the vicinity. The broadest definition for the zone of influence 147 is the entire store, and the narrowest definition is the immediate vicinity of the media element 130.

In the exemplary zone 147 of influence shown in FIG. 3, the present invention measures the audience behavior in more detail. For example, the present invention can differentiate the people, e.g. 701 and 702, who actually viewed the message of different media types in the media element 130 from the people, e.g. 703, who are just passers-by, through a measurement for the attentive viewership 951 in comparison with a general looking 952, and count the number of viewers.

The definition of zone of influence 147 can be extended for other forms of media elements in the store that do not involve visual interaction. Such media elements can communicate with the audience through other senses like smell, touch, taste, sound, etc. The present invention can measure the traffic and dwell time for such elements, but may not provide a measure of engagement.

A media element 130 can be divided into smaller sub-elements, and audience engagement for each sub-element can be measured separately. The characteristics of a sub-element do not have to match with those of its parent, but the sub-element is defined in connection with the parent media element in the present invention.

FIG. 4 shows an exemplary table for the category of clustered sites of media elements 162 and an exemplary table for media element type and information 163 for the exemplary extrapolation process based on the clustering of the sites in an exemplary embodiment of the present invention.

The analysis module of the present invention can utilize any well-known extrapolation methods for extrapolating the measurement of behavior patterns and demographic analysis from the sampled nodes of media elements to a group of media elements that are measured. In the following description, one node or site comprises at least one media element.

In an exemplary embodiment of the present invention, sites with similar media element types are clustered together. The media element types can be defined based on various factors, such as the size of the media element, product presence in the media element, merchandize display, the type of media in the sampled media element, the similarity results from the previous behavioral pattern analysis in the vicinity of the media element, the demographic similarity of the local region where the sampled site is located, the transaction data in relation to the media element, and the relative location of the media element in the store layout.

For example, in an exemplary embodiment, a "site cluster 1" can comprise "site 1," "site 2," and "site 3", and the sites, i.e. "site 1," "site 2," and "site 3," in the "site cluster 1" can comprise "media element type 1" (MT1), "media element type 2" (MT2), "media element type 3" (MT3), and "media element type 4" (MT4). Not all of the sites may have the same number of media element types. For example, in this example, the "site 1" can comprise all of the four different media element types, while the "site 2" may comprise only a subset of all media element types, such as "media element type 1" (MT1), "media element type 3" (MT3), and "media element type 4" (MT4), and the "site 3" may also comprise only another subset of all media element types, such as "media element type 2" (MT2), "media element type 3" (MT3), and "media element type 4" (MT4).

The present invention can keep a table for the category of clustered sites 162, which comprises information for the site clusters and their associated media element types. One of the goals of using the table for the category of clustered sites of media elements 162 is to characterize the media elements based on certain characteristics, such as size of the media element, product presence, merchandize display, and whether or not the media element is permanent or temporary.

Once the categorization is processed, the present invention can produce a table for the list of media element types and their associated information in the exemplary table for media element type and information 163. The table comprises the attribute information for the media element cluster category, site, and location of all of the available media elements for each media element type.

In the exemplary embodiment shown in FIG. 4, the "media element type 1" (MT1) in the media element type column comprises two sets of attributes, [CAT1, SITE1, LOC1] and [CAT1, SITE2, LOC1], which designate the "media element type 1" (MT1) in the "site 1" and "site 2". The "media element type 1" (MT1) cannot be found in any other sites than the "site 1" and "site 2" in the network of media elements according to the exemplary embodiment.

Similarly, the other media element types in the media element type column comprise their relevant sets of attributes, which designate the corresponding media element types in the relevant sites.

Based on the exemplary table for media element type and information 163, the present invention can select sample media elements per each media element type and extrapolate the result to all of the other media elements within the same media element type category. For simplicity, the number of attribute sets per media element type in the exemplary table for media element type and information 163 shown in FIG. 4 is very minimal. However, in a real-world application, the number of attribute sets per media element type is usually larger. The percentage value of the sampling for the sample media elements per each media element type can be predefined by the decision maker in the retail space.

Figure 5:
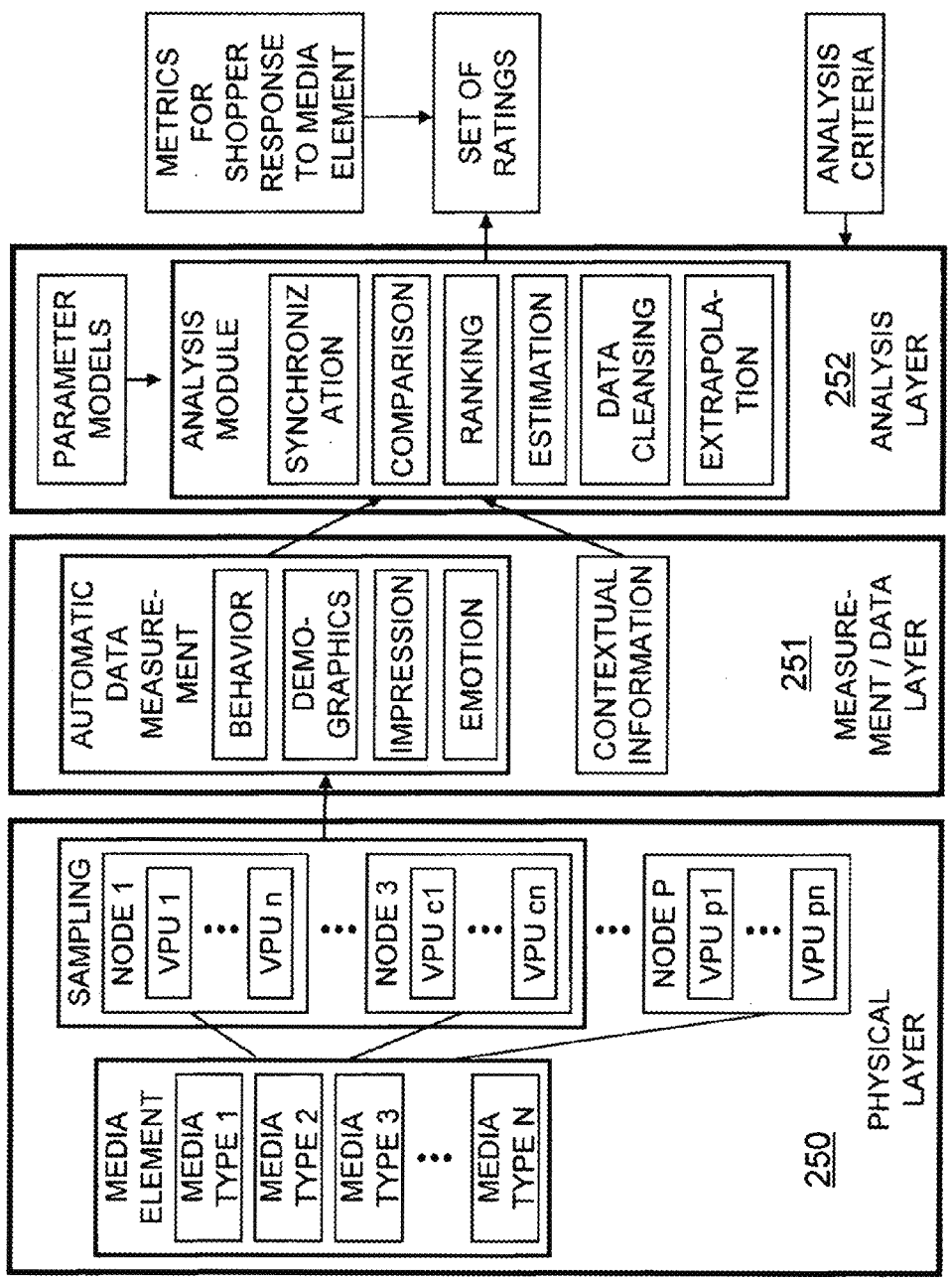
FIG. 5 shows exemplary layers that comprise key modules and components of the present invention.

FIG. 5 shows exemplary layers that comprise key modules and components of the present invention.

The first layer is the physical layer 250, consisting of nodes and video processing unit(s) (VPU) for each node. A node is composed of at least a media element, which contains media with one or more media types. The VPUs consist of a plurality of means for capturing images 100, such as cameras, installed in the space and connected to servers. The servers or the VPUs can convert the video stream into audience data, including behavior and demographics. Some other types of specialized hardware may be used to perform this step. The plurality of means for capturing images 100 are set up in a way to cover the physical space in the vicinity of the media element under consideration. The plurality of means for capturing images 100 may be installed in a sample of locations to build a representative sample.

The second layer is the measurement and data layer 251. The VPUs use automated video processing algorithms to convert video into audience data. The audience data can comprise behavior, demographics, impression, and emotion data.

Behavior data consists of the actions performed by the audience, such as duration of time standing in front of a media element. The demographic data consists of an audience profile, such as age range, gender, and ethnicity. The data will be used to segment the audience into logical groups based on the advertisers' needs. The impression data measures the level of impression by the audience, by counting the actual viewers of the media element or measuring the average viewing time of the media element by the viewers. The emotion data consists of the emotional changes of people in response to the media element.

The data can be further augmented by combining contextual information that enhances the value of analytics. Examples of such contextual information include, but are not limited to, spatiotemporal information of the node where the media element is displayed, environmental information, and media consumption information about the expected audience members in the specific geographical location. This contextual information can be pre-stored in a database, and then combined with the audience measurement data to produce an intelligent analysis in a specific context.

The third layer is the analysis layer 252. The analysis module processes various synchronizations. For example, the module synchronizes the measurements for the multiple media in the media element for comparing the performance of the media side by side. The relative effectiveness of different marketing tactics through the media in the media element is ranked based on the exposure measurement to the media types in the media element.

The module also synchronizes the content play log of digital media types with the audience measurement data. Through the synchronization, the module can compare the contents of digital media in the media element in a more uniform way. The analysis modules can also rank the synchronized digital contents based on their performance in comparison to other digital content. For example, the contents and displays of other media types can be ranked according to the order of impression-level counts per segmentation. The final result of the analysis produces a set of ratings for the media in the media element. The ratings are standardized according to predefined standards.

The present invention can sample the nodes in a media element network and extrapolate the result throughout all of the nodes in the media element network. In this case, the actual audience data, generated from the sample nodes, is used to extrapolate the audience data and generate the estimated audience data for the entire network. The analysis module uses the outputs from the measurement layer 251 and cleans the data by removing corrupt or incomplete data sets. It then combines the data with applicable statistical parameter models, such as distributions, and produces an audience data set. The audience data set includes estimated audience measurement for every unit in the physical space.

Figure 6:
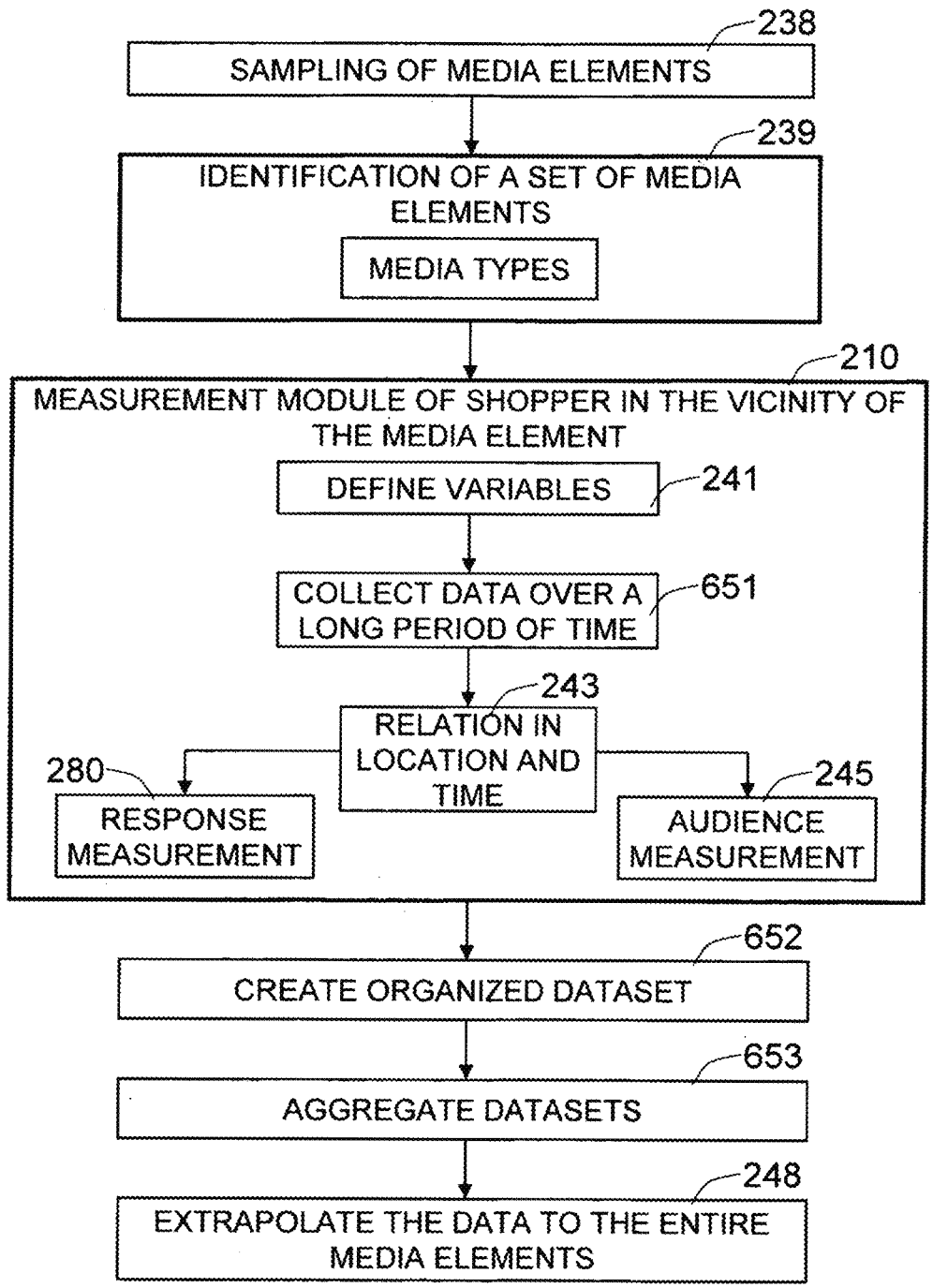
FIG. 6 shows an exemplary framework and processes of relating the data with respect to the location and time.

FIG. 6 shows an exemplary framework and processes of relating the data with respect to the location and time.

The present invention is a unified framework that allows any number of engagement measurements in the framework and compares all of the responses in a uniform manner with respect to media elements. In an exemplary embodiment, the key processes in the framework comprise the following steps:
1) sampling of media elements 238,
2) identifying a set of media elements in the target area 239,
3) measuring shopper behavior in response to the media in the sampled media elements 210,
4) defining a set of variables for the response measurement 241,
5) collecting data over a long period of time 651,
6) correlating the measured response 280 and audience 245 data, based on location and time 243,
7) creating an organized dataset 652,
8) aggregating the organized datasets 653, and
9) extrapolating the datasets to the entire store 248.

Exemplary behaviors in the measurement of shopper behavior include various types of behaviors, such as stopping and looking, with regard to exposure and engagement at the media element, and the output of the measurement can be stored as relational data.

The measurement method in the preferred embodiment of the present invention is an automated measurement based on computer vision algorithms. The response measurement measures different types of behaviors. Some examples of the different types of behaviors comprise:
the number of trips,
time spent in a location in the vicinity of media elements,
the number of looks, and
the number of predefined interactions.

Although segmentation is not the direct response of the customers as a part of the step for analyzing the audience of the media element, the segmentation data such as demographics can also be measured at this step. The shopper segments may be defined by demographics such as gender, age and ethnicity, or by the type of trip such as a quick trip or a fill-up trip.

The present invention measures not only the response to a media element, but also the relationship among the responses relative to each other. One of the relationships among the gathered data is calculated with respect to location and time. The response data can also be synchronized with other non-proprietary datasets. The datasets comprise sales, promotional schedules, store clusters by formats, location demographics, etc., for an entire chain(s).

Through the syndicated data process, the present invention removes randomness that is specific to a certain media element or store from the measurement, i.e., measurement of the audience engagement to the media in the media element or store. This enables the present invention to have representative data measurement and metrics for a store and remove systematic errors. For example, dwell time in the zone of influence can be adjusted relative to the length of the media element, so that the absolute dwell time in a shorter media element will not have a skewed result compared to the other dwell time in longer media elements among multiple measured media elements. The process of normalizing the absolute values to a specific range, such as between 0 and 1, is a way to remove the randomness and to have a syndicated data in the present invention. With respect to the syndication, the present invention creates the standardized indices in response to the media element.

Figure 7:
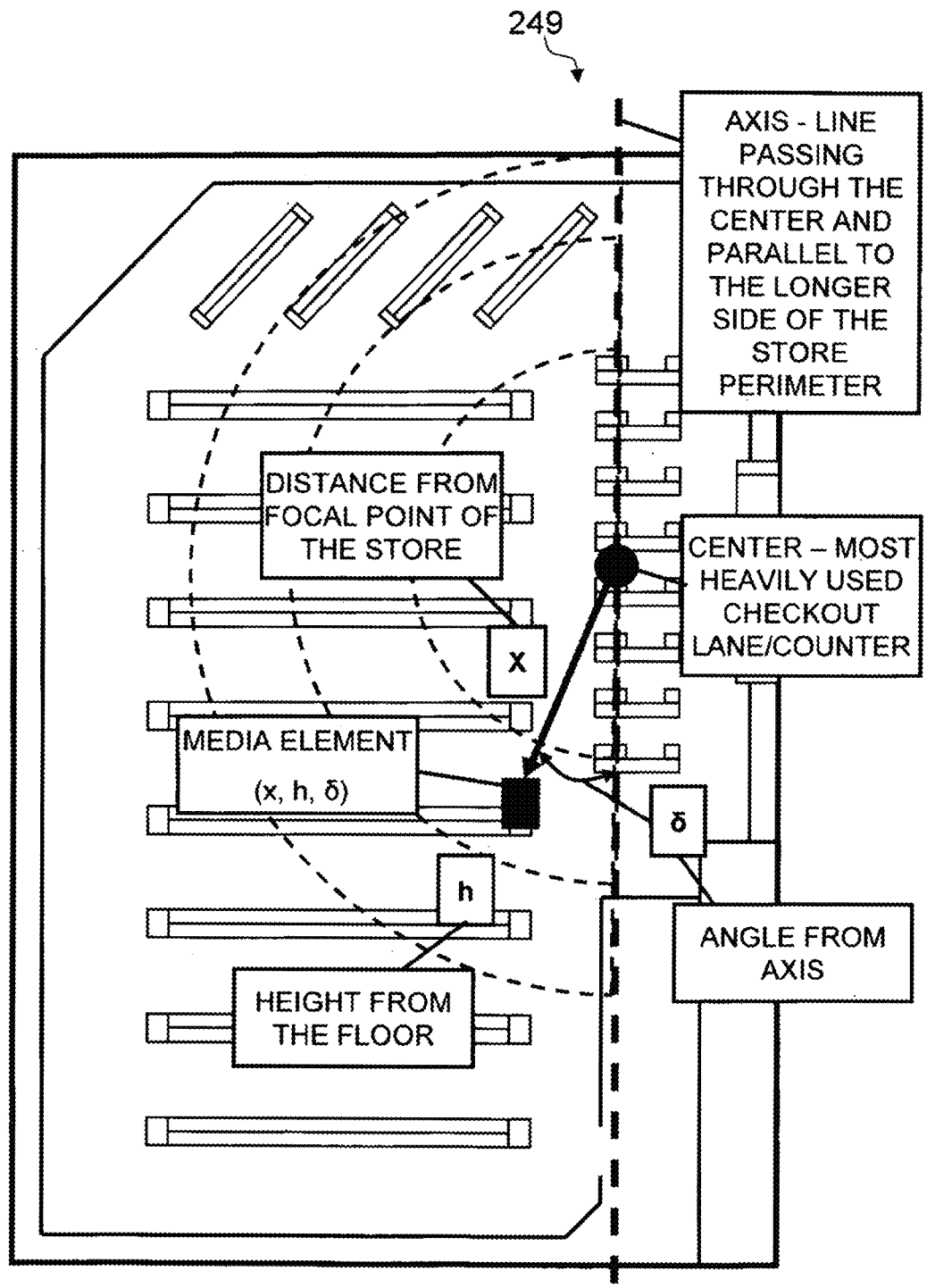
FIG. 7 shows an exemplary normalization of the coordinates among multiple media elements.

FIG. 7 shows an exemplary normalization of the coordinates 249 among multiple media elements.

One of the primary factors impacting the level of traffic and engagement that a media element receives is the location with respect to the center of the store. Therefore the invention will use the coordinates of the media element as one of the parameters for grouping similar media elements in the store and across different layouts. These parameters will also allow us to develop mathematical models describing the variation in engagement based on changes in media element location, therefore helping in extrapolating engagement measurement. For example, media elements at the eye level placed close to the center of the store are most likely to receive high traffic and engagement, whereas elements placed farther away from the center of the store or above eye level are less likely to receive traffic or engagement.

The center of the store will be defined as the most actively used checkout lane or counter in the store. This definition of the center is important as most shoppers are likely to pass through this point in the store. The center can also be defined in other ways, such as the primary entrance to the store. Once the definition of center is decided, it will remain consistent across all of the stores in the chain.

The axis of the store will be defined as lines passing through the center of the store and parallel to the longer side of the store perimeter. If the store is not rectangular, then the axes can also be defined in other ways, such as the line perpendicular to a majority of the aisles. The center of the media element is defined as the geometric center of the media element.

In an exemplary process, the current invention uses a cylindrical coordinate system to identify the location of each media element, but other systems such as polar or rectangular coordinate systems can also be used. Each media element will have up to 4 variables defining its location— "x", "h", "d", and "δ". "x" is the shortest distance between the center of the store and the center of the media element. "δ" is the angle between the axis and the line connecting the center of the store and the center of media element. "h" is the height of the base of the media element from store floor. "d" is the vertical length of the element.

Figure 8:
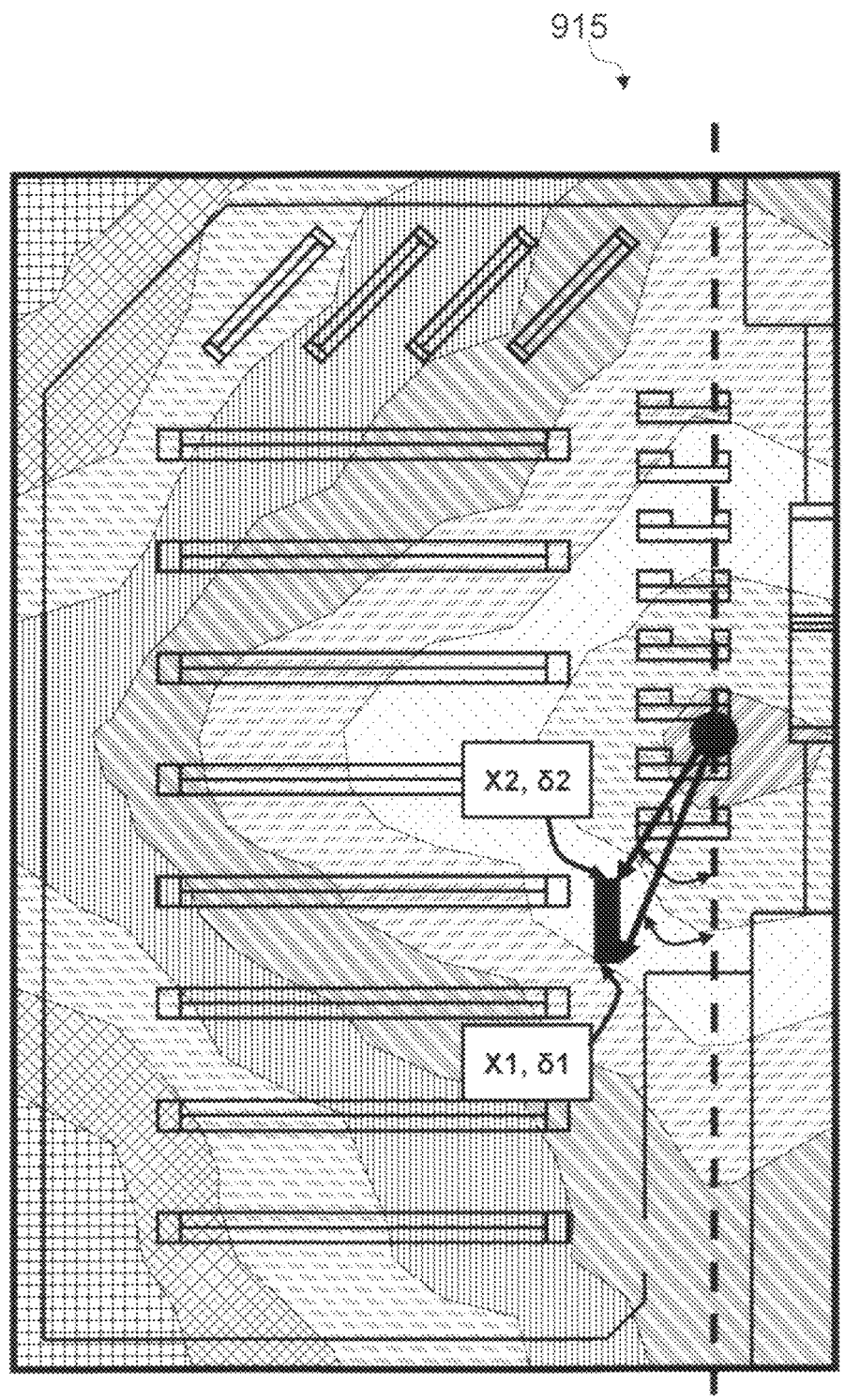
FIG. 8 shows the traffic density distribution in a store with respect to the center of the store.
Figure 9:
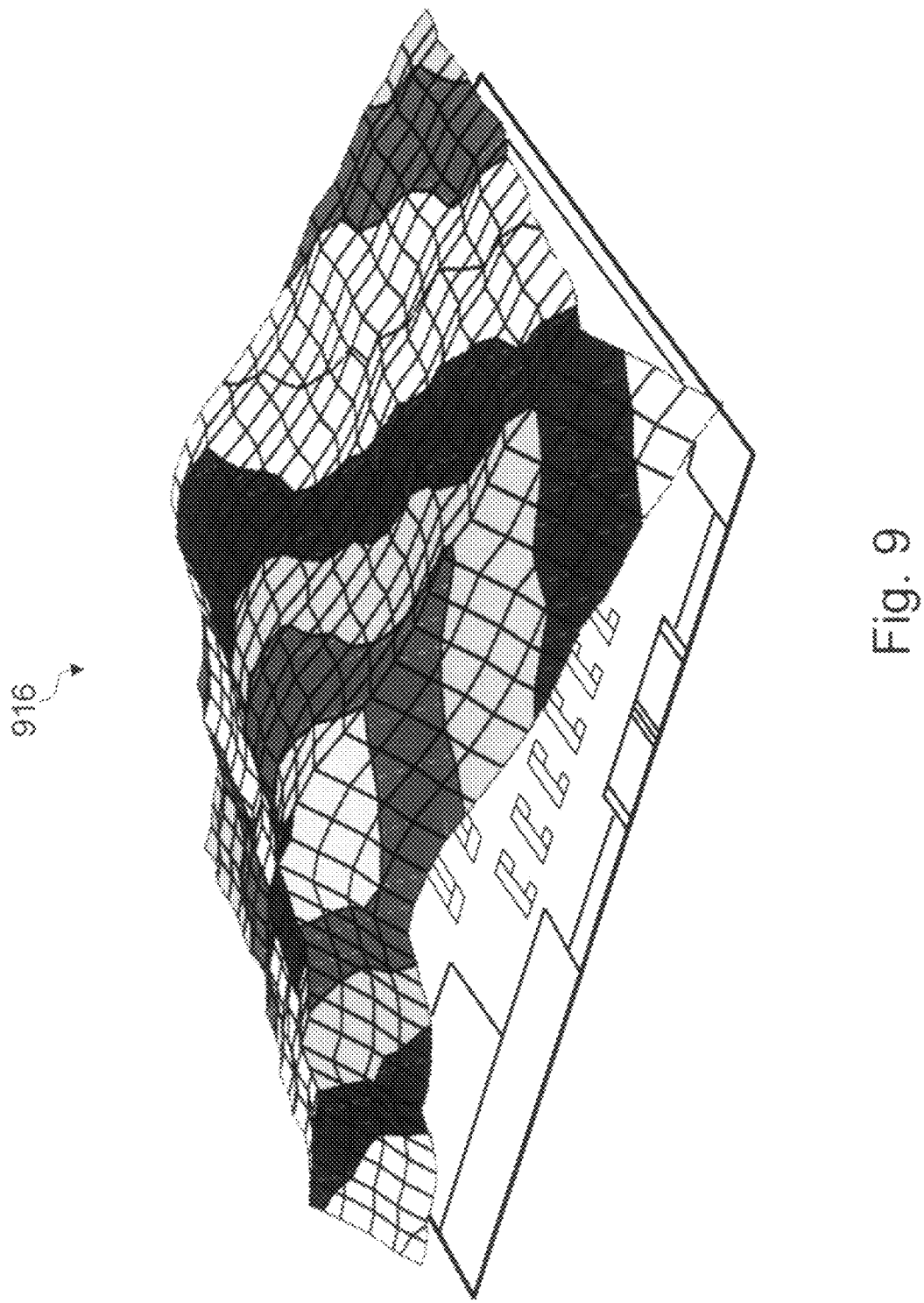
FIG. 9 shows the traffic density distribution in a store with respect to the center of the store in 3D view.

FIG. 8 shows the traffic density distribution 915 in a store with respect to the center of the store. FIG. 9 shows the traffic density distribution in 3D 916 in a store with respect to the center of the store in 3D view.

Based on the traffic data collected using in-store traffic sensors, an empirical mathematical model will be developed to estimate the traffic density in a given point in the store, as a percentage of the traffic at the center, based on its coordinates.

$$\Gamma_{MediaElement} = \int_{\delta_1}^{\delta_2} \int_{x_1}^{x_2} f(\Gamma_{Center}, x, \delta) dx d\delta \qquad (1)$$

where $\Gamma_{MediaElement}$ is the total traffic exposure of the media element, $\Gamma_{Center}$ is the total traffic exposure of the center of the store, $(x_1, \delta_1)$ and $(x_2, \delta_2)$ are the starting and ending points of the media element, and $f(\Gamma_{Center}, x, \delta)$ is the empirical function that estimates the traffic density at a particular spot in the store.

The mathematical model will also be beneficial in estimating the traffic density in other stores that have a similar layout but are not equipped with traffic measurement sensors.

Figure 10:
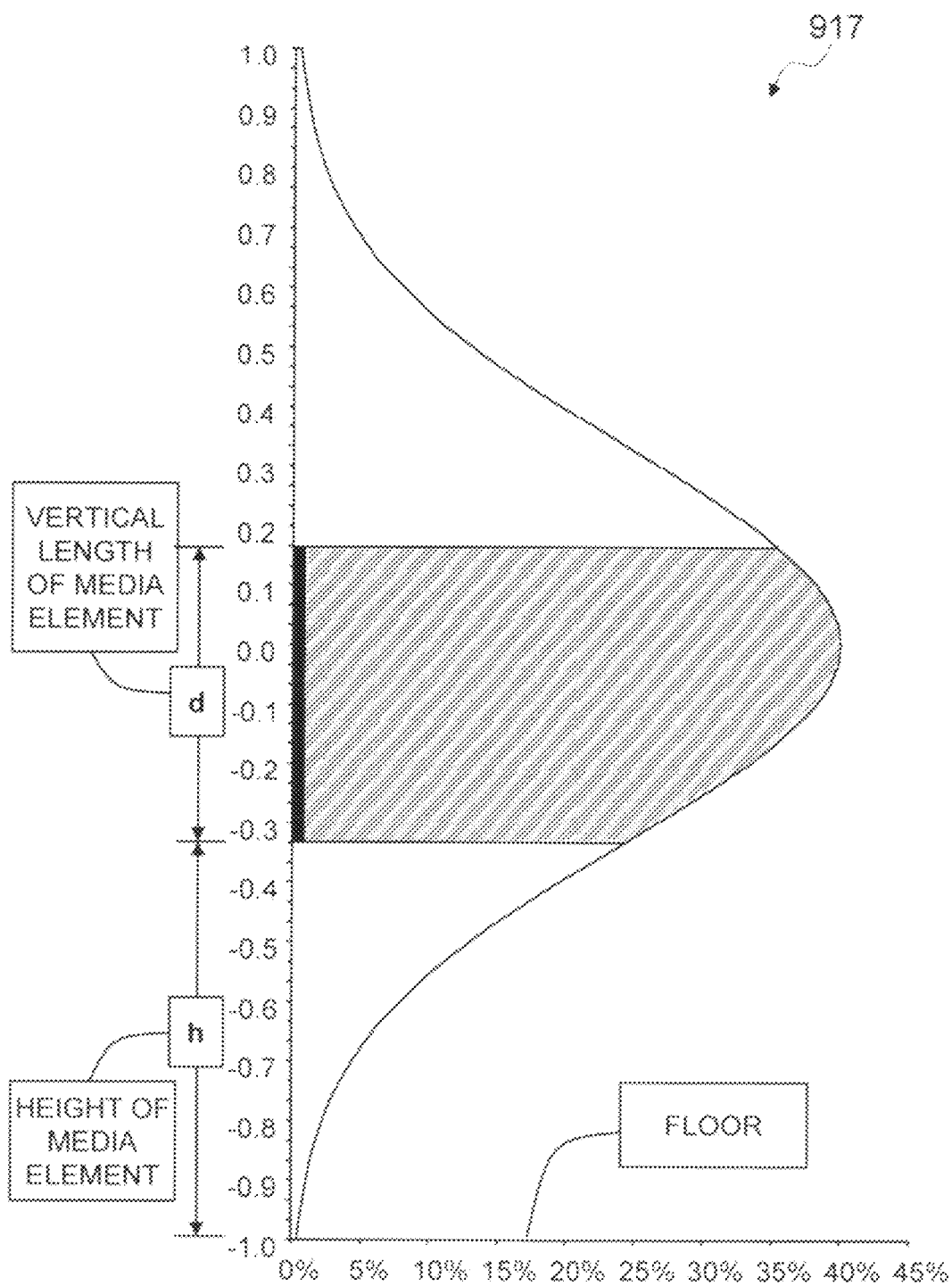
FIG. 10 show the probability distribution of the passer-by traffic that is likely to notice a particular media element based on its height from the floor and surface area.

FIG. 10 show the probability distribution of the passer-by traffic 917 that is likely to notice a particular media element based on its height from the floor and surface area.

As shoppers navigate the store, they are most likely to notice an object that is at eye level and less likely to notice an element above or below the eye level.

Based on the impressions data collected using in-store traffic sensors, an empirical mathematical model will be developed to estimate the likelihood that a shopper will notice the display.

$$p_{MediaElement} = \int_{h}^{h+d} f(h) dh \qquad (2)$$

where $p_{MediaElement}$ is the probability that the media element is noticed by the passer-by traffic, h is the height of the base of the media element, d is the vertical length of the media element, and f(h) is the empirical formula that estimates the probability of notice at a particular height from the store floor.

The total exposure received by the media element is estimated by multiplying the estimated passer-by traffic density in front of the element with the probability of notice.

$$\text{Exposure} = \Gamma_{MediaElement} * p_{MediaElement} \qquad (3)$$

Gross Rating Points (GRP) for the media element is calculated using the following formula:

$$GRP = \frac{\text{Exposure}}{\text{Total\_Population}} \qquad (4)$$

"Total Population" is the total number of people who live in the surrounding area and are expected to shop there.

Similar calculations can also be done at the store level to estimate the GRP of the store.

GRP calculated for a particular shopper segment is called "Targeted Rating Points" (TRP). In order to estimate the TRP for the media element we estimate the exposure and total population for the particular shopper segment and use the same equation.

Other valuable media measurement metrics are:

$$\text{Unique\_Audience} = \frac{\text{Exposure}}{\text{Frequency}} \quad (5)$$

"Unique Audience" is the number of unique shoppers expected to be exposed to the media element during a particular month.

"Frequency" is defined as the average number of time a typical shopper visits the media element during a given month. The metric is estimated using surveys and intercept interviews.

$$\text{Reach} = \frac{\text{Unique\_Audience}}{\text{Total\_Population}} = \frac{GRP}{\text{Frequency}} \quad (6)$$

"Reach" of the media element is defined as the percentage of total population that may be exposed to the media element.

Figure 11:
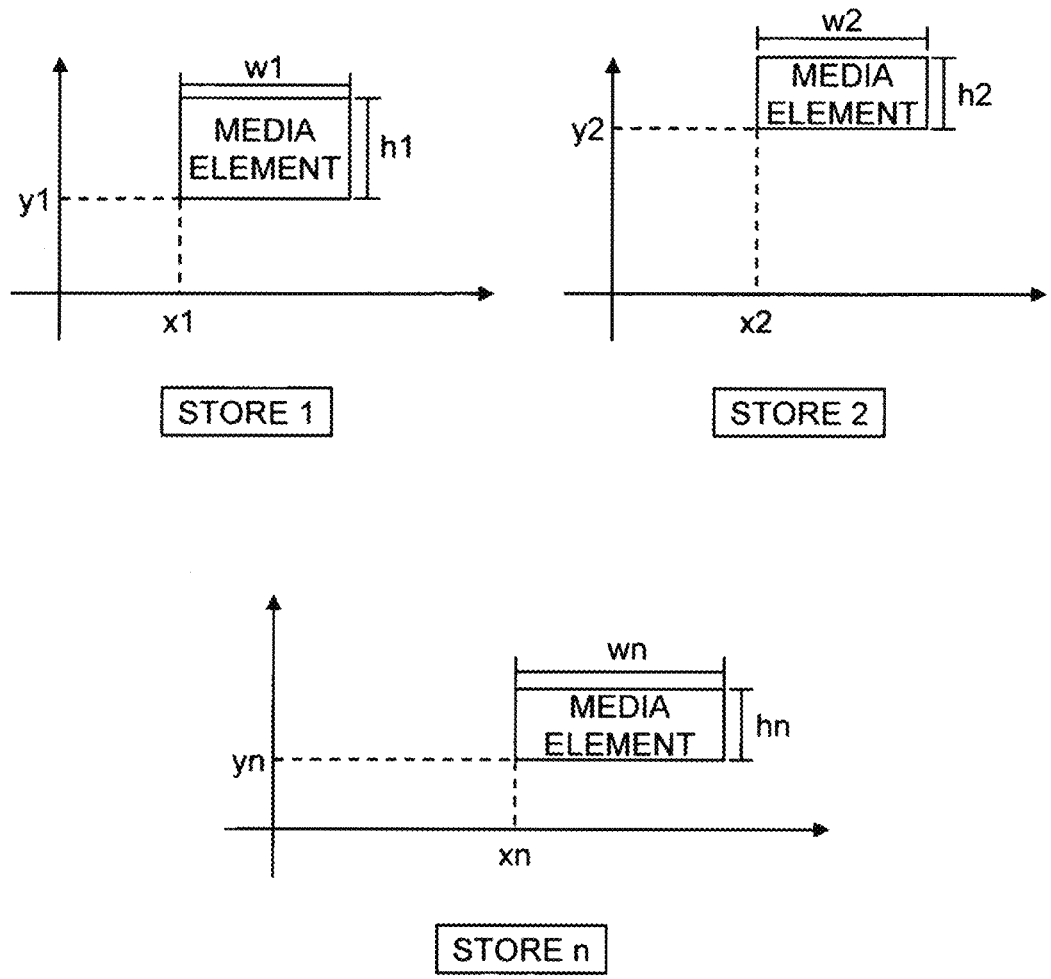
FIG. 11 shows another exemplary normalization process through scaling.

FIG. 11 shows another exemplary normalization process through scaling.

In order to avoid a skewed measurement, the coordinates of media elements from different locations and conditions are normalized. One way of normalization is to make the coordinate systems similar among different stores, so that the distance (xi, yi) and size (wi, hi) are made the same among the measured target media elements. For this process, scaling factors can be applied to the different cases.

For example, in the example shown in FIG. 11, the location of the media elements in different stores can be normalized, using a simple scaling matrix, such as:

$$Si = \begin{bmatrix} SXi & 0 \\ 0 & SYi \end{bmatrix} \quad (7)$$

where SXi and SYi are the scaling factors for media element "i", and Si is applied to the coordinate of the location of the media element "i".

Each store layout is mapped to a coordinate system, and the origin of the coordinate system is predefined. In addition, the widths, i.e., w1, w2, and wn, can be scaled by scaling factors, e.g., 1, w2/w1, and wn/w1, respectively, while the heights, i.e., h1, h2, and hn, are also scaled by scaling factors, e.g., 1, h2/h1, and hn/h1, respectively, in this example.

FIG. 12 shows an exemplary table for the data measured by the response measurement processes in the present invention.

The exemplary table of the response measurement for a media element 622 comprises information for the track sequence, start and end time of the tracking, behavior class, demographic class, impression level, and emotion class in each of the track sequences for shoppers in the captured images for an exemplary media element, i.e., "media element MEi", based on the response measurement methods. The table can also contain other input that is useful for measuring the customers' response, such as member media types. The response measurement is calculated at the measurement and data layer. As a part of the process to represent the rating in a standardized way, the present invention can build another table of the ratings for a group of pairs that comprise the in-store location of the media element and the media type.

By associating the spatiotemporal information from the track sequences, such as the coordinates and time of entrance and exit of the shopper in the media element area, the present invention can classify which media type(s) was in contact with the shopper, and the other attributes, i.e., behavior class, demographic class, impression level, and emotion level, are calculated in association with the spatiotemporal information and the media type(s) at the analysis layer.

Figure 13:
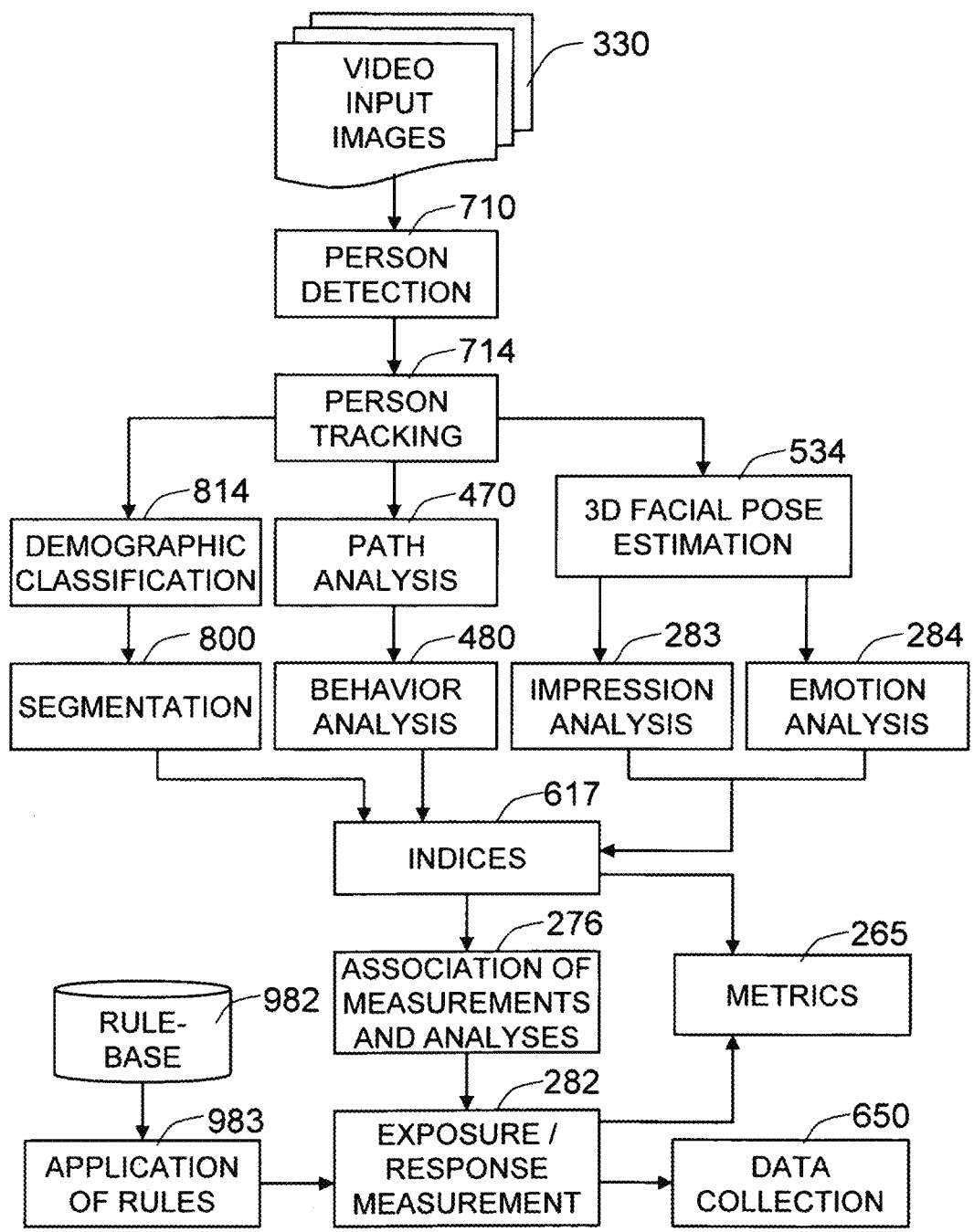
FIG. 13 shows exemplary processes for the measurement of people's responses to a target media element, in which computer vision-based behavior analysis and segmentation measurement, i.e., demographics measurement, impression analysis, and emotion analysis, are associated in an exemplary embodiment of the invention.

FIG. 13 shows exemplary processes for the measurement of people's responses to a target media element, in which computer vision-based behavior analysis and segmentation measurement, i.e., demographics measurement, impression analysis, and emotion analysis, are associated in an exemplary embodiment of the invention.

The present invention comprises modules of:
automatic behavior measurement and analysis,
automatic demographics measurement and analysis,
impression analysis,
emotion change measurement and analysis, and
a module for associating the measurements and analyses.

In a preferred embodiment, the present invention automatically processes the video-based analysis. The present invention identifies high-level numbers along various interaction stages of the person with the media element that is measured for the performance level of the media in the media element. The variables can include behavioral measurement and segment information, such as demographics.

The indices are aggregated to indicate the performance of the media element. A sampled group of media elements can be ranked among themselves, and the highest performing media element can be selected as the best performing media element in the store area. The indices of the sampled group of media elements can also be extrapolated to other media elements of the entire media elements that are of interest in the store area or the network of media elements.

In another exemplary analysis for individual media performance, the present invention compares the measurements for a group of media types vs. another group of media types in the target media element. For example, the present invention can compare the conversion ratios in response to one group of media types vs. the conversion ratios in response to another group of media types in the target media element. Then, higher conversions of shoppers, such as those that turn from simple passers-by to viewers in response to one group of media types than the another group of media types in the target media element, indicate that the target media element is relatively more effective in influencing shoppers in the first group of media types compared to the another group of media types.

The conversions of different groups of media types can be ranked, and the highest performing group of media types can be selected for the media element. In another exemplary embodiment, the present invention can also extrapolate the optimal media element and its media types to other media elements.

Furthermore, the present invention measures the effectiveness in relation to each demographic segment. Demographic segmentation can be used to identify the impact of a media element on specific shopper segments. In an exemplary embodiment, the present invention produces comparison results of the index matrices or tables in relation to demographic segmentation. The present invention can organize the measurement of the response to the media element or media type based on the segmentation and trip type analysis of the people. The segmentation comprises demographic segments, including age range, gender, and ethnicity.

Typical trip types are: stock-up, fill-in, quick trip, and occasion-based. Stock-up trips are shopping trips in which people visit a large number of store areas, spend significant time in the store, and make large purchases. Fill-in trips are shorter compared to stock-up trips and are usually made between stock-up trips to refill the products consumed in between; these trips have fewer categories visited and have smaller basket sizes. Quick trips are very short trips made to the store to purchase specific items; these trips have very small basket sizes, typically of 1 or 2 items. Occasion-based trips are made to fulfill a specific need, such as to purchase ingredients for a recipe, a birthday party, a holiday, etc.; the basket size can vary based on the occasion, but usually a specific set of categories are visited. For example, a trip related to a birthday party might include a visit to the bakery, CSD, chips, gifts, etc.

In the exemplary embodiment shown in FIG. 13, the present invention detects 710 and tracks 714 a person, such as a shopper, in the video input images 330, from a plurality of means for capturing images 100. The present invention can join the trajectories of the person tracks from a video of a means for capturing images 100 to another video of a means for capturing images 100 while the person appears and disappears between the fields-of-view among a plurality of means for capturing images 100. Based on the tracking information, the present invention performs the path analysis 470 of the particular person. The path analysis 470 can be used as one of the ways to process the behavior analysis 480 of a person and obtain useful information about the person's behavior, such as engagement behavior with the media element.

The present invention can utilize any reliable video-based tracking method for a single customer and a group of customers as in the prior art, in regard to the behavior analysis. For example, U.S. Pat. No. 8,009,863 of Sharma, et al. (hereinafter Sharma U.S. Pat. No. 8,009,863) disclosed an exemplary process of video-based tracking and behavior analysis for people in a physical space based on the information for the trip of the people, using multiple means for capturing images in a preferred embodiment of the invention.

The present invention can also process segmentation 800 of the people, based on the images of the people in the video. Demographic classification 814 is an exemplary segmentation 800 of the people.

The present invention can utilize any reliable demographic composition measurement method as in the prior art as an exemplary video-based segmentation of the people. For example, U.S. patent application Ser. No. 11/805,321 of Sharma, et al., (hereinafter Sharma Ser. No. 11/805,321) disclosed an exemplary demographic composition measurement based on gender and ethnicity.

The segmentation 800 and behavior analysis 480 data are used to produce indices 617, and the indices 617 are sent to the module for the association of measurements and analyses 276, which calculates the media element performance rating through the exposure and engagement measurement 282.

Impression analysis 283 and emotion analysis 284 are carried out on images of the people to measure the impact of the media element on the people in fine detail.

The impression measurement module counts and measures the impression length. The impression measurement module can also process a deeper impression analysis in correlation with other parameters, such as the duration of viewing time for a particular media element per demographic segmentation. With regard to the impression count and measurement, the present invention can utilize any well-known impression measurement method. U.S. patent application Ser. No. 11/818,554 of Sharma, et al., (hereinafter Sharma Ser. No. 11/818,554) disclosed details of a system for measuring the impression level through the viewership of people. An exemplary embodiment of the present invention shown in FIG. 13 can utilize Sharma Ser. No. 11/818,554 for the impression measurement in the impression analysis 283, especially utilizing the 3D facial pose estimation 534.

The impression analysis 283 and emotion analysis 284 measurements are very important for understanding the impact of the media element on the people who were exposed to it. The measurements can teach us to understand whether or not a media in the media element was engaging enough to hold the attention of the people, and whether or not the media produced the desired emotional change in the people.

In an exemplary embodiment, the impression analysis 283 module can utilize other variables to measure the deeper level of impression. The other variables can comprise the relationship of the media element with the surrounding categories, demographic segmentation, and temporal attributes.

For example, a more than average number of impression counts for a media element in relation to a specific demographic group indicates that the media element was able to attract and engage the specific demographic group in a particularly meaningful pattern. Likewise, the impression count data can be analyzed to measure the impact on each predefined demographic group in relation to the particular media element. Each metric gives a measure of response to the media element as a whole and individual graphics. A media element that can attract more people and engage them longer can be considered better than the other media element that does not.

The emotion analysis 284 module measures the emotional response people have to a given media element. Whenever a person engages with media in a media element, his or her facial expression could change in reaction to the media in the media element.

Usually the goal of the media in the media element is to entice a positive and happy response. The degree (valance) by which a person reacts to a media will be measured using vision-based technologies. A set of video input images 330 is provided to the emotional change detection sub-module that measures the magnitude of the emotional change.

This reaction is defined as the persuasiveness of the media element. The average of all emotional reactions to a media element can be considered as the unified emotional response to the media element. The following equation gives an exemplary way to calculate persuasiveness.

$$\text{persuasiveness} = \frac{k}{\text{Total\_impressions}} \sum_{n=1}^{k} \partial \text{emotion}_n \tag{8}$$

Where k is the total number of impressions that had an emotional response to the media in a media element ∂emotion$_n$ is the change in response associated with the nth impression.

Several approaches exist for analyzing static images of faces to track the expressions and estimate the emotional state of a person. For example, J. F. Cohn, A. J. Zlochower, J. Lien, and T. Kanade, "Automated face analysis by feature point tracking has high concurrent validity with manual FACS coding," Psychophysiology, pp. 35-43 1999 (hereinafter Cohn), focuses on classification of static images of the face, which are associated with expression of particular emotions. Several approaches have also been reported for analyzing a sequence of images for facial expression analysis and estimating the emotional state of a person. For example, I. A. Essa and A. P. Pentland, "Facial expression recognition using a dynamic model and motion energy," presented at International Conference on Computer Vision, June 1995 (hereinafter Essa) disclosed an automated system for facial expression detection using optical flow coupled with a physical model of face muscles to describe the facial motions, and Y. Yacoob and L. S. Davis, "Recognizing Human Facial Expression," University of Maryland, Technical Report CS-TR-3265, May 1994, (hereinafter Yacoob) followed a three-level recognition approach based on the optical flow of points with high gradient values. The above methods aim at classifying low-level facial expressions into FACS type Action Units (AUs).

The present invention can utilize an approach for measuring the change in emotion in response to a media element from an analysis of the change of the facial expression, as suggested in Cohn and Essa. Specifically, the present invention can detect a positive or negative change in the "valence" of the emotion so that it can be used as a measure of persuasiveness of the media element. In a preferred embodiment, the present invention can utilize the emotion change detection method disclosed in U.S. patent application Ser. No. 12/154,002 of Moon, et al., (hereinafter Moon Ser. No. 12/154,002).

The measured data can be stored in a database at the data collection process 650. The analysis of the measured data can be further facilitated by applying 983 a set of predefined rules in a rule base 982.

Rule Application Logic Module

In the present invention, the analysis of the measured data can be further facilitated by applying 983 a set of predefined rules for the media element performance rating in a rule base 982 through a rule application logic module. The rule application logic module can enable a dynamic rule application rather than relying on an ad hoc solution or static hard-code in translating the measured data.

An exemplary rule application logic module can be implemented utilizing the information unit verification technologies in U.S. Pat. No. 7,904,477 of Jung, et al. (hereinafter Jung).

The rule application logic module enables the adjustment in the analysis to be done in a structured and dynamic way. The exemplary parameter models, such as the analysis formula and statistical model, can be dynamically adjusted based on the rule application logic module.

In an exemplary embodiment, the rule application logic module constructs measurement and analysis criteria based on a set of predefined rules. The rule application logic module can further construct the criteria based on a combination of a set of predefined rules, in which the analysis of the data can be performed in further detail. The rule application logic module can further define domain-specific criteria for the media element performance rating.

The rule application logic module can facilitate the process of producing a unified and standardized media element performance rating, by normalizing the variance within the predefined thresholds. For example, if a measurement for a media element is skewed due to less desirable environmental factors, the differences can be adjusted by applying normalization offset values to the differences within predefined thresholds using the rule application logic module. Then, the analysis can take this into consideration at the final analysis of the media element performance rating.

The application of the rule application logic module can differentiate the levels of measurement and analysis of the media element performance rating, where a first set of criteria are applied throughout the preliminary data, and a second set of criteria are applied to the next level of data for a complicated analysis, in order to serve specific needs of the complicated analysis. An exemplary first set of criteria can typically comprise common criteria throughout all of the categories, and the second set of criteria is typically different from the first set of criteria.

Figure 14:
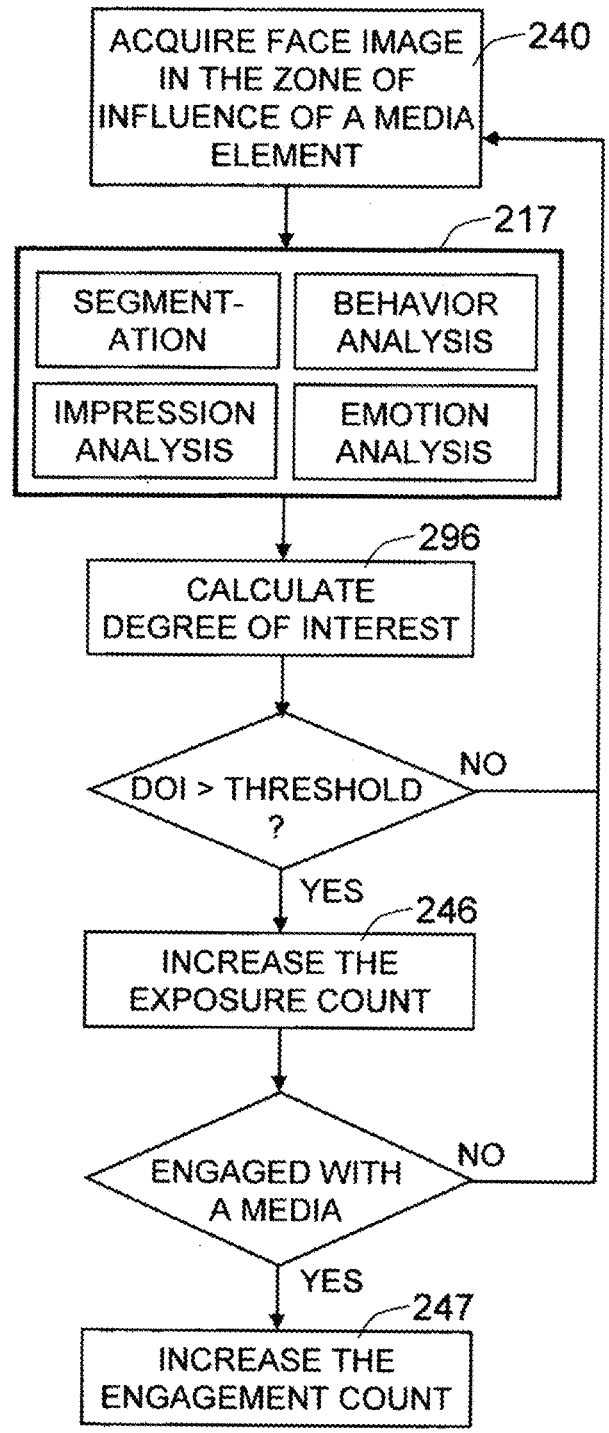
FIG. 14 shows details of exemplary exposure and response measurement.

FIG. 14 shows details of exemplary exposure and response measurement.

After acquiring face images 240 in the zone of influence of a media element and processing behavior measurement, segmentation, impression analysis, and emotion analysis though the exposure and response measurement module 217, as discussed, the present invention calculates 296 the degree of interest (DOI) based on the measurement. If the DOI is larger than the threshold, the present invention records the incidence, such as by increasing the exposure count 246 for the specific media element. The level of customer interaction with the media element can be further detailed, so that if the customer further engages with a media in the media element, the incidence is also recorded. For example, the present invention can increase the engagement count 247. The DOI and the level of further interaction, e.g., the engagement with a media element, may be calculated based on the measurement for the customer's head orientation, exposure time, closeness to the media elements, etc., as a part of the behavior analysis and impression analysis.

Figure 15:
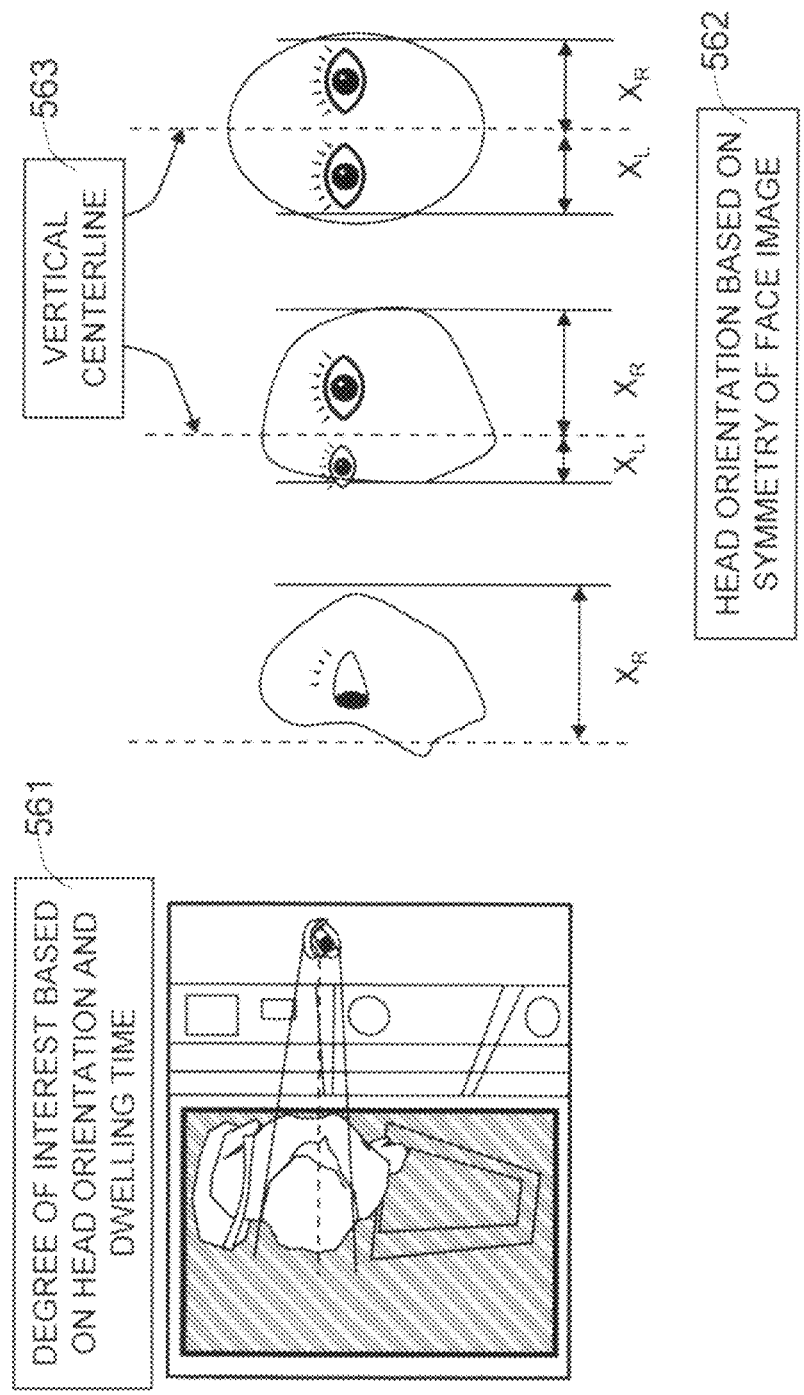
FIG. 15 shows an exemplary measurement for the degree of interest based on the degree of head orientation and dwell time in the zone of influence in the vicinity of a media element.

FIG. 15 shows an exemplary measurement for the degree of interest based on the degree of head orientation and dwell time 561 in the zone of influence in the vicinity of a media element.

The degree of head orientation can be calculated based on the symmetry of the face image 562. One exemplary method for the symmetry measurement is to use a correlation measure between pixel values of the left region and pixel values of the right region around a vertical centerline 563 in the edge-detected face image. The correlation coefficient, C(dx, dy), can be a well known correlation coefficient definition, such as:

$$C(dx, dy) = \frac{\sum_{(x,y) \in P_{all}} [p_1(x, y) - p_{avg1}][p_2(x + dx, y + dy) - p_{avg2}]}{\sqrt{\sum_{(x,y) \in P_{all}} [p_1(x, y) - p_{avg1}]^2 \sum_{(x,y) \in P_{all}} [p_2(x + dx, y + dy) - p_{avg1}]^2}} \quad (9)$$

where p1(x, y) is a pixel value of (x, y) in the left region sub-image, p2(x+dx, y+dy) is a pixel value of (x+dx, y+dy) in the right region sub-image, (dx, dy) is a disparity between matched pixels in the regions, $p_{avgi}$ is the average pixel values in the region "i", and $P_{all}$ is all the pixels in the image.

The vertical centerline 563 may not be found if the face image is asymmetrical when the customer's head turned away from the optical axis of the camera with a large angle. If a vertical centerline 563 is found due to symmetry, the widths of the left region and the right region, i.e., $X_L$ and $X_R$, can be calculated using the lengths between the vertical centerline 563 and the edge lines of the face that pass through the outermost face edge pixel. The degree of head orientation (DHO) may be calculated using the proportion of the widths, i.e., $X_L$ and $X_R$. For example, the $DHO_i$ for a media element "i" can be defined as:

$$DHO_i = Min(X_{Li}, X_{Ri})/Max(X_{Li}, X_{Ri}) \quad (10)$$

The DHO can be used as a factor for the measurement of the degree of interest (DOI). For example, in this approach, the $DOI_i$ for a media element "i" can be defined as:

$$DOI_i = DHO_i * T_i \quad (11)$$

where $T_i$ is the dwell time of the customer in the zone of influence of a media element "i".

Figure 16:
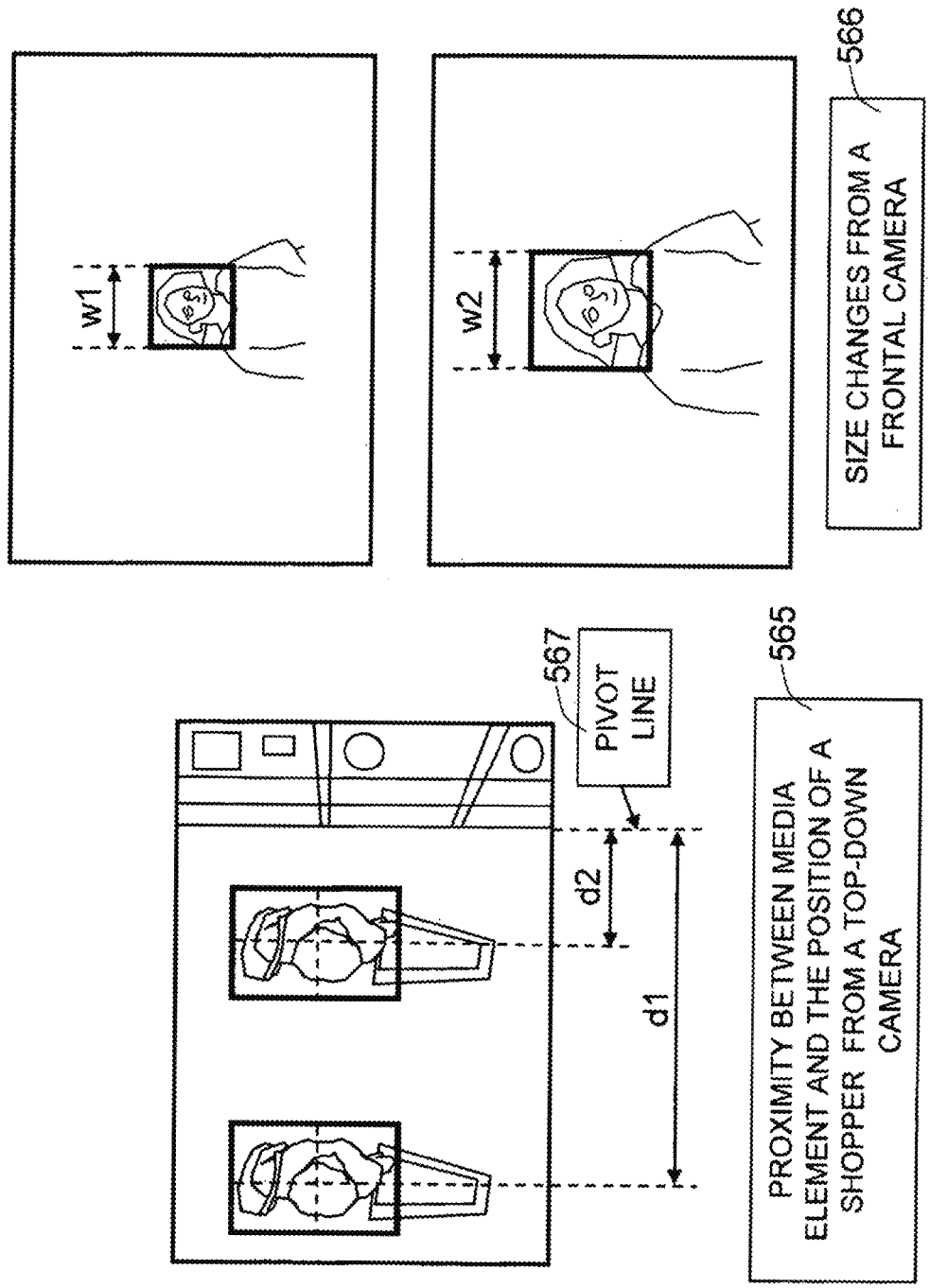
FIG. 16 shows an exemplary measurement for the degree of interest based on the proximity change and dwell time in the zone of influence in the vicinity of a media element.

FIG. 16 shows an exemplary measurement for the degree of interest based on the proximity change and dwell time in the zone of influence in the vicinity of a media element.

If a customer is interested in the media element, the person may approach more closely to the media element for getting information from the media element. Therefore, the proximity 565 change measure can be used for measuring the degree of interest as a part of the customer's response measurement.

The proximity 565 between the media element and the position of a shopper can be measured from the images captured by a top-down camera. For example, a person detection based on blob detection shows the coordinate sequence of the shopper in the zone of influence of a media element. The proximity is calculated based on the distance from a pivot line 567 to the coordinate of the shopper. The pivot line 567 is predefined around an edge of the media element location. The durations of dwell time are measured for each distance. For example, a dwell time for distance "d1", i.e, $T_{n1}$, and another dwell time for distance "d2", i.e, $T_{n2}$, during the shopper's appearance in the zone of influence are calculated. By associating the distances and dwell times, the present invention can determine the degree of interest. For example, in this approach, the degree of interest, $DOI_i$, for a media element "i" can be defined as:

$$DOI_i = \frac{\left(\frac{1}{d2} * T_{n2}\right)}{\left(\frac{1}{d1} * T_{n1}\right)} \quad (12)$$

where $d_{min} < d1 \leq d_{max}$, $d_{min} \leq d2 < d_{max}$, and $d2 < d1$, and where $d_{min}$ is a predefined minimum distance from a pivot line in the zone of influence, $d_{max}$ is a predefined maximum distance from a pivot line in the zone of influence, $T_{n1}$ is a dwell time for a distance d1, and $T_{n2}$ is a dwell time for a distance d2.

Another method to measure the proximity is to use the size changes 566 of the shopper's face image. The size changes 566 of the shopper's face image can be measured from the images captured by a frontal camera. For example, face detection can produce the width of the bounding box for the detected face image. Maximum and minimum widths can be predefined, and the various sizes of the width can be divided into a predefined number of partitions. The durations of dwell time are measured according to the corresponding partition of the width size. For example, a dwell time, i.e, $T_{n1}$, is measured for the width, e.g., w1, and another dwell time, i.e, $T_{n2}$, is measured for the width, e.g. w2, during the shopper's appearance in the zone of influence.

By associating the sizes and dwell times, the present invention can determine the degree of interest. For example, in this approach, the degree of interest, $DOI_i$, for a media element "i" can be defined as:

$$DOI_i = \frac{(w_2 * T_{n2})}{(w_1 * T_{n1})} \quad (13)$$

where $w_{min} \leq w1 < w_{max}$, $w_{min} < w2 \leq w_{max}$, and $w1 < w2$, and where $w_{min}$ is a predefined minimum width of the face bounding box, $w_{max}$ is a predefined maximum width of the face bounding box, $T_{n1}$ is a dwell time for a width w1, and $T_{n2}$ is a dwell time for a width w2.

In another exemplary method, the degree of interest may be defined as a combination of various measurements. For example, the degree of interest may be defined as a combination of the degree of head orientation, proximity change measure, and dwell time, such as:

$$DOI_i = \frac{\left(\frac{1}{d2} * T_{n2}\right)}{\left(\frac{1}{d1} * T_{n1}\right)} * DHO_i \quad (14)$$

The default value of the $DOI_i$ is set to zero, and if a shopper appears in the zone of influence, the present invention processes each measurement. If the shopper does not show any interest to the media element, the shopper is just passing by the zone of influence, or if the dwell time is under the predefined threshold, the degree of interest could be made zero by setting the dwell time zero.

Figure 17:
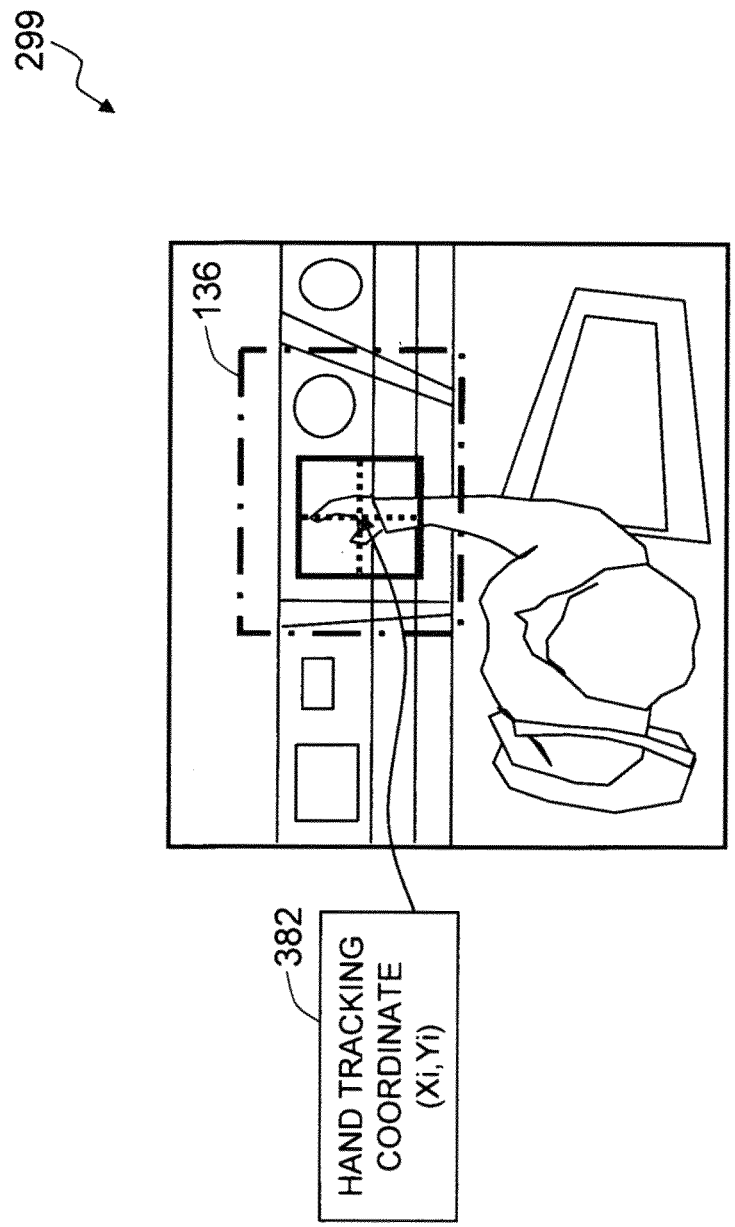
FIG. 17 shows exemplary measurement of shopper interaction in the zone of influence in the vicinity of a media element.

FIG. 17 shows exemplary measurement of shopper interaction in the zone of influence in the vicinity of a media element and engagement ratio calculation 299.

In the example, a media bounding box 136 is defined for each media of a media element. The media bounding box 136 can be defined in an interaction zone in the vicinity of the media, where the interaction with the media can easily be determined. If the hand tracking coordinate 382 stays within the bounding box for longer than a threshold, the interaction can be regarded as a more engaging interaction by the shopper. Multiple thresholds can also be used to further differentiate the level of engagement. The time of engagement can be compared with the time of exposure to calculate the engagement ratio of a shopper to a specific media. For example, an engagement ratio ($ER_i$) for a media "i" can be defined as follows:

$$ER_i = \frac{T_{engagement}(i)}{T_{exposure}(i)} \quad (15)$$

where $T_{engagement}(i)$ is an amount of time during which the shopper engaged with a media "i", and $T_{exposure}(i)$ is an amount of time during which the media is exposed to the shopper in the zone of influence.

The accumulated ERi data for a predefined period of time for a group of shoppers can show the "engagement conversion performance of a media" (ECPi) for a media "i" in the media element for the group of shoppers during the measurement period, which can be defined as an average of the accumulated ERi, as follows:

$$ECP_i = \frac{\sum_{p=1}^{m} ERi(p)}{m} \quad (16)$$

where m is the number of measured people and $ER_i(p)$ is the engagement ratio of the person "p" for a media "i".

The accumulated ECPi data can show the overall "engagement conversion performance of a media element" (ECPmei) for a media element "mei" for the group of shoppers during the measurement period, which can be defined as an average of the weighted ECPi, as follows:

$$ECP_{mei} = \frac{\sum_{i=1}^{m} ECPi * wi}{m} \quad (17)$$

where m is the number of media in the media element, $ECP_i$ is the engagement conversion performance of the media "i", and wi is a weight assigned to the media "i".

Figure 18:
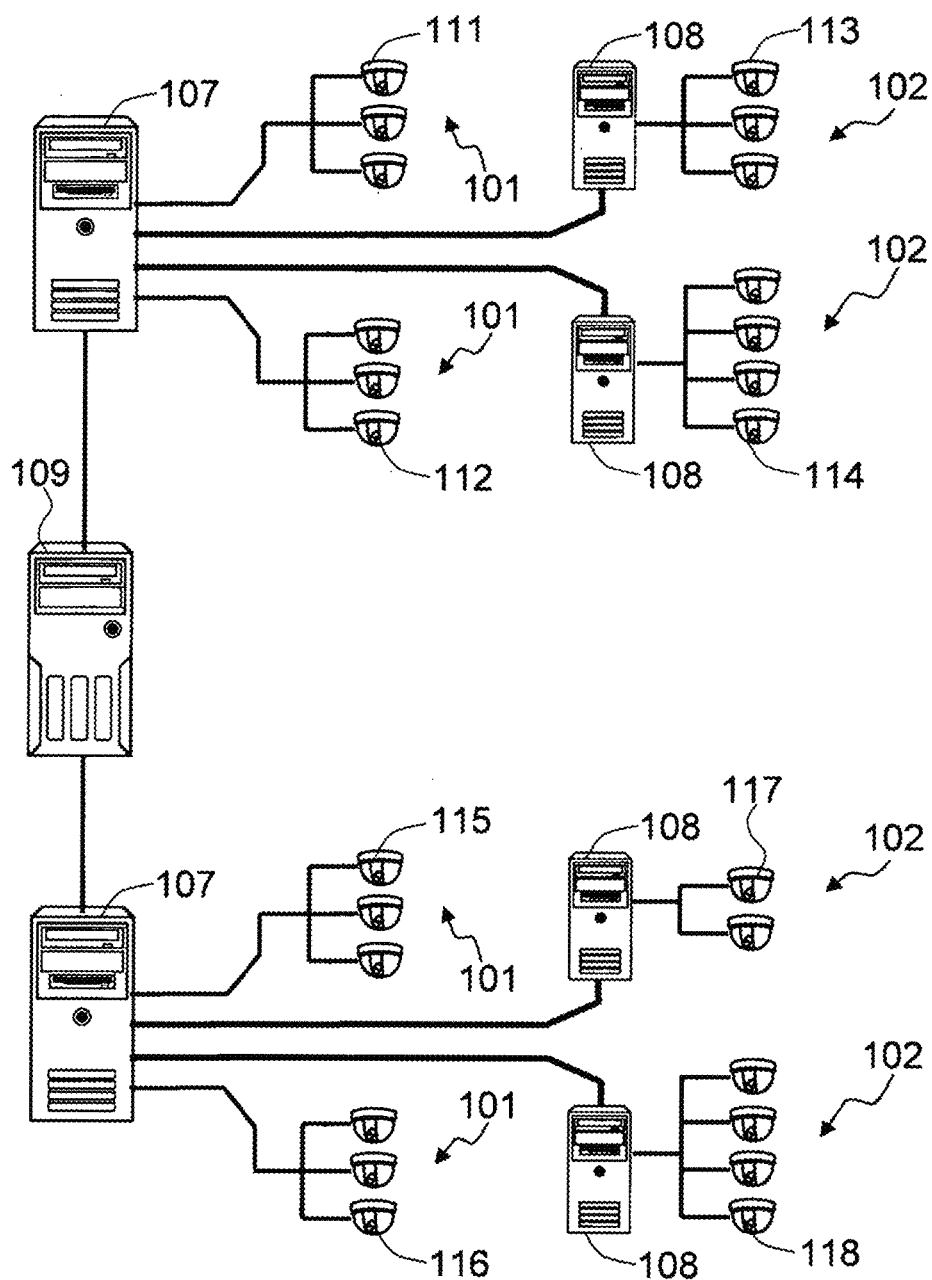
FIG. 18 shows an exemplary network of a plurality of means for control and processing and a plurality of means for capturing images in the present invention.

FIG. 18 shows an exemplary network of a plurality of means for control and processing and a plurality of means for capturing images in the present invention for a media element performance rating, where the network further consists of a plurality of first means for control and processing and a plurality of second means for control and processing, which communicate with each other to synchronize the time-stamped lists of measurement among a plurality of video streams captured by the means for capturing images in the measured locations.

The present invention is an apparatus for rating an in-store media element based on the measurement for behavior patterns and demographics of the people in the vicinity of the media element. The apparatus comprises means for capturing a plurality of input images of the people by at least a means for capturing images, e.g., first means for capturing images 101 and second means for capturing images 102, in the vicinity of the media element, and means for processing the plurality of input images, e.g., first means for control and processing 107 or second means for control and processing 108, in order to measure the behavior patterns and demographics of each person in the people tied to the media element. The apparatus also comprises means for aggregating the measurements for the behavior patterns and demographics of the people, and means for calculating a set of ratings for the media element based on the measurements. The behavior patterns comprise traffic count, impression, and impact to audience. The first means for control and processing 107 or second means for control and processing 108 may be used as the exemplary embodiment of these means for aggregating the measurements and means for calculating a set of ratings.

In the exemplary embodiment, a plurality of means for capturing images, e.g., a plurality of first means for capturing images 101, are connected to the means for video interface in a means for control and processing, e.g., a first means for control and processing 107.

The sensors are placed in a distributed architecture to facilitate the measurement of the response data. If the distance between the plurality of means for capturing images is greater than a means for control and processing can handle, e.g., in order to cover the multiple areas for multiple media element performance ratings in multiple categories that are located far from each other, the plurality of means for capturing images can be connected to multiple means for video interface.

For example, in the exemplary embodiment shown in FIG. 18, a plurality of first means for capturing images 101, such as a "means for capturing images 1" 111 and a "means for capturing images 2" 112, are connected to the means for video interface in a first means for control and processing 107 that is different from the first means for control and processing 107 of another plurality of first means for capturing images 101, such as a "means for capturing images 5" 115 and a "means for capturing images 6" 116. The plurality of means for control and processing can be connected in a local area network and communicate with each other.

In an exemplary deployment of the system that embodies the present invention, the first means for capturing images 101 can be installed where the field-of-view can cover the traffic of the people in the measured location and the second means for capturing images 102 can be installed in the vicinity of a media element in the location for the close view of the people. The means for capturing images are connected to the means for video interface through cables.

The digitized video data from the means for video interface is transferred to the means for control and processing that executes computer vision algorithms on the data. The means for control and processing can have internal means for storing data or external means for storing data.

The means for capturing images can comprise an analog camera, USB camera, or Firewire camera. The means for video interface, which can comprise a video frame grabber, USB interface, or Firewire interface, are typically included in the same enclosure as the means for control and processing.

The means for control and processing can be a general purpose personal computer, such as a Pentium 4 PC, or a dedicated hardware, such as a FPGA-based implementation of a device, which can carry out the required computation. The means for control and processing, as well as the means for video interface, can be placed locally or remotely, as long as the connection to the means for capturing images can be established.

The internal means for storing data, such as internal hard disk drives, is placed within the same enclosure as the means for control and processing. The external means for storing data, such as a network storage driver or internal hard disk drives contained in a remote computer, can be placed locally or remotely, as long as a means for transferring data is available.

The present invention can generate time-stamped measurements in accordance with the behavior analysis, segmentation, impression analysis measurement, and emotion change measurement, utilizing a time server 109. The exemplary time server 109 can maintain a synchronized time in the network of means for control and processing. In another exemplary embodiment, a first means for control and processing 107 can act as a server, and a plurality of second means for control and processing 108 can act as clients. The server can run its own local clock or be connected to a global time server 109 for the synchronization utilizing a time synchronization protocol, such as the Network Time Protocol (NTP). The time-stamped measurements facilitate the synchronized analysis, calculation, and utilization of the measurements.

The number of means for capturing images per a means for control and processing varies, depending on the system configuration in the physical space. However, each means for control and processing knows the identification of the associated plurality of means for capturing images that are assigned to the selected locations in a store area and the area covered by the means for capturing images.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for rating an in-store media element based on automatic measurements for behavior patterns and demographics of the people in the vicinity of the media element,
    by providing at least a time server, wherein the time server generates time-stamped measurements in accordance with behavior analysis, segmentation, impression analysis, and emotion change measurements, and a video processing unit, wherein the video processing unit comprises at least a sensor for capturing images and a server, wherein the video processing unit converts video into audience data and, wherein video comprises image data, audience data comprises numerical data including behavior, demographics, impression, and emotion data, and wherein behavior data comprises a time duration of a person standing in front of the media element, impression data comprises the number of viewers for the media element, and emotion data comprises a persuasiveness metric, and wherein the video processing unit rates the media element by the steps of:
    a) capturing a plurality of input images of the people by at least a sensor for capturing images in the vicinity of the media element wherein the images comprise a top-down view or a frontal view of the people,
    b) processing the plurality of input images in order to measure the behavior patterns and demographics of each person tied to the media element by executing computer vision algorithms on the plurality of input images, (to generate a numerical metric, or other some functional element)
    c) processing a path analysis of each person among the people for the behavior analysis by applying a computer vision technology based tracking algorithm to the plurality of input images, wherein attributes of the path analysis comprise information for initial point and destination, global trip, time, and average velocity,
    d) measuring impression levels by detecting an act of viewing the media element by the people in a zone of influence of the media element,
    e) aggregating the measurements for the behavior patterns and demographics of the people, and
    f) calculating a set of standardized ratings for the media element based on the measurements,
    wherein a media element is a space or hardware that holds various types of media,
    wherein the behavior patterns comprise traffic count, impression, and impact to audience, and
    wherein the demographics comprise age range, gender, and ethnicity.

2. The method according to claim 1, wherein the method further comprises a step of ranking relative effectiveness of different marketing tactics based on the audience measurements to the media types in the media element wherein the effectiveness comprises the average impression duration for the media types.

3. The method according to claim 1, wherein the method further comprises a step of synchronizing a play log of digital contents with the measurements for the behavior patterns and demographics of the people, and ranking the synchronized digital contents based on their performance.

4. The method according to claim 1, wherein the method further comprises a step of sampling media elements in a group of stores,
    wherein sites with similar media element types are clustered together, and
    wherein the automatic measurements for the behavior patterns and demographics of the people for the sample are extrapolated to other media elements within the same media element type category.

5. The method according to claim 1, wherein the method further comprises a step of organizing the ratings according to automatic segmentation of people, including the demographics of the people and trip types,
    wherein the trip types comprise stock-up, fill-in, quick trip, and occasion-based.

6. The method according to claim 1, wherein the method further comprises a step of measuring opportunity to see, gross rating points, targeted rating points, return on investment, unique audience, frequency, and reach based on the measurements for the behavior patterns and demographics of the people.

7. The method according to claim 1, wherein the method further comprises a step of converting the ratings into a standardized output,
    wherein a rule application logic module normalizes variance of the ratings within a predefined threshold.

8. The method according to claim 1, wherein the method further comprises a step of utilizing a rule application logic module for analyzing the aggregated measurements,
    wherein the rule application logic module applies a first set of criteria to a preliminary data in the aggregated measurements and a second set of criteria to a next level of data,
    whereby the rule application logic module enables the adjustment in the analysis of information to be done in a structured and dynamic way.

9. The method according to claim 1, wherein the method further comprises a step of producing metrics and measuring datasets for the metrics,
    wherein the metrics comprise attraction index, engagement index, and conversion index, and
    wherein the datasets comprise total traffic exposed to the campaign, total reach achieved, conversion ratio, and total engagement duration of all of the viewers, based on the automatic measurements for the behavior patterns and demographics of the people.

10. The method according to claim 1, wherein the method further comprises a step of detecting the emotional changes of the audience in response to the media types in the media element,
    wherein an average of the emotional changes to the media element is considered as an unified emotional response to the media element, and wherein the emotional changes are aggregated with the measurements for the behavior patterns and demographics of the people to calculate the set of ratings for the media element.

11. An apparatus for rating an in-store media element based on automatic measurements for behavior patterns and demographics of the people in the vicinity of the media element,
 by providing at least a time server, wherein the time server generates time-stamped measurements in accordance with behavior analysis, segmentation, impression analysis, and emotion change measurements, and a video processing unit, wherein the video processing unit comprises at least a sensor for capturing images and a server, wherein the video processing unit converts video into audience data and, wherein video comprises image data, audience data comprises numerical data including behavior, demographics, impression, and emotion data, and wherein behavior data comprises a time duration of a person standing in front of the media element, impression data comprises the number of viewers for the media element, and emotion data comprises a persuasiveness metric, and wherein the video processing unit rates the media element by the steps of:
 a) capturing a plurality of input images of the people by at least a sensor for capturing images in the vicinity of the media element wherein the images comprise a top-down view or a frontal view of the people,
 b) processing the plurality of input images in order to measure the behavior patterns and demographics of each person tied to the media element by executing computer vision algorithms on the plurality of input images, (to generate a numerical metric, or other some functional element)
 c) processing a path analysis of each person among the people for the behavior analysis by applying a computer vision technology based tracking algorithm to the plurality of input images, wherein attributes of the path analysis comprise information for initial point and destination, global trip, time, and average velocity,
 d) measuring impression levels by detecting an act of viewing the media element by the people in a zone of influence of the media element,
 e) aggregating the measurements for the behavior patterns and demographics of the people, and
 f) calculating a set of standardized ratings for the media element based on the measurements,
 wherein a media element is a space or hardware that holds various types of media,
 wherein the behavior patterns comprise traffic count, impression, and impact to audience, and
 wherein the demographics comprise age range, gender, and ethnicity.

12. The apparatus according to claim 11, wherein the apparatus further comprises means for ranking relative effectiveness of different marketing tactics based on the audience measurements to the media types in the media element wherein the effectiveness comprises the average impression duration for the media types.

13. The apparatus according to claim 11, wherein the apparatus further comprises means for synchronizing a play log of digital contents with the measurements for the behavior patterns and demographics of the people, and ranking the synchronized digital contents based on their performance.

14. The apparatus according to claim 11, wherein the apparatus further comprises means measuring opportunity to see, gross rating points, targeted rating points, return on investment, unique audience, frequency, and reach based on the measurements for the behavior patterns and demographics of the people.

15. The apparatus according to claim 11, wherein the apparatus further comprises means for sampling media elements in a group of stores,
 wherein sites with similar media element types are clustered together, and
 wherein the automatic measurements for the behavior patterns and demographics of the people for the sample are extrapolated to other media elements within the same media element type category.

16. The apparatus according to claim 11, wherein the apparatus further comprises means for organizing the ratings according to segments of people, including the demographics of the people and trip types,
 wherein the trip types comprise stock-up, fill-in, quick trip, and occasion-based.

* * * * *